United States Patent [19]

O'Gwynn et al.

[11] Patent Number: 4,731,679
[45] Date of Patent: Mar. 15, 1988

[54] METHOD AND APPARATUS FOR TRANSPORTING A RECORDING MEDIUM WITH AN ADAPTIVE VELOCITY CHANGE PROFILE

[75] Inventors: David C. O'Gwynn, Colorado Springs, Colo.; Thomas L. Helmers, Millbrae, Calif.

[73] Assignee: Ampex Corporation, Redwood City, Calif.

[21] Appl. No.: 653,972

[22] Filed: Sep. 20, 1984

[51] Int. Cl.⁴ .................... G11B 15/46; G11B 15/48
[52] U.S. Cl. .................................. 360/73; 360/74.4; 360/72.2; 318/7
[58] Field of Search ...................... 360/71, 72.1–72.3, 360/73, 13, 74.1–74.4, 14.1–14.3; 318/6, 7, 561, 327; 242/186, 188, 191, 75.5, 75.51, 75.52

[56] References Cited

U.S. PATENT DOCUMENTS

| | | | |
|---|---|---|---|
| 3,641,504 | 2/1972 | Sidline | 360/72.3 |
| 3,681,523 | 8/1972 | Sidline | 360/72.2 |
| 3,728,685 | 4/1973 | Stalnert | 360/72.1 |
| 3,736,565 | 5/1973 | Sidline | 360/72.2 |
| 3,910,527 | 10/1975 | Buhler et al. | 242/186 |
| 4,032,897 | 6/1977 | Pooley | 360/72.3 |
| 4,267,564 | 5/1981 | Flores | 360/72.3 |
| 4,438,889 | 3/1984 | Schonmier | 242/75.51 |
| 4,461,433 | 7/1984 | Kani | 360/73 |
| 4,511,937 | 4/1985 | Guerrero | 360/72.1 |
| 4,531,166 | 7/1985 | Anderson | 360/73 |

FOREIGN PATENT DOCUMENTS 0091190 10/1983 European Pat. Off. .............. 360/73

Primary Examiner—Raymond F. Cardillo
Assistant Examiner—Steven R. Garland
Attorney, Agent, or Firm—Elizabeth E. Strnad; Richard P. Lange

[57] ABSTRACT

An adaptive velocity change profile for control of a video tape transport apparatus during a cue mode. The tape transport apparatus moves the video tape to a cue point in the shortest time available by adapting a deceleration velocity change profile to the actual ballistics of transport of the tape. When in a cue mode, the transport uses a commanded velocity signal generator to produce digital numbers which are applied as a reference speed signal to a velocity servo driving the takeup reel of the transport. For distances separating a selected frame location on the tape from the cue point greater than a predetermined distance, the commanded velocity is the maximum available from the transport. For distances to the cue point less than the predetermined distance, the commanded velocity is generated from an adaptive cue profile which decelerates the transport of the tape quickly as the selected frame location approaches the cue point without overshooting the mark. The deceleration velocity change profile is optimized as according to the distance separating the selected frame location from the cue point and the measured ballastics of transport of the tape. The measured ballistics of transport of tape varies according to variances in inertial loading represented by transport direction, tape reel size, and cue location with respect to tape pack distribution. The difference between velocity values for optimized profiles of the maximum and minimum inertial loading is proportioned depending upon the measured inertial loading to generate the commanded velocity.

27 Claims, 25 Drawing Figures

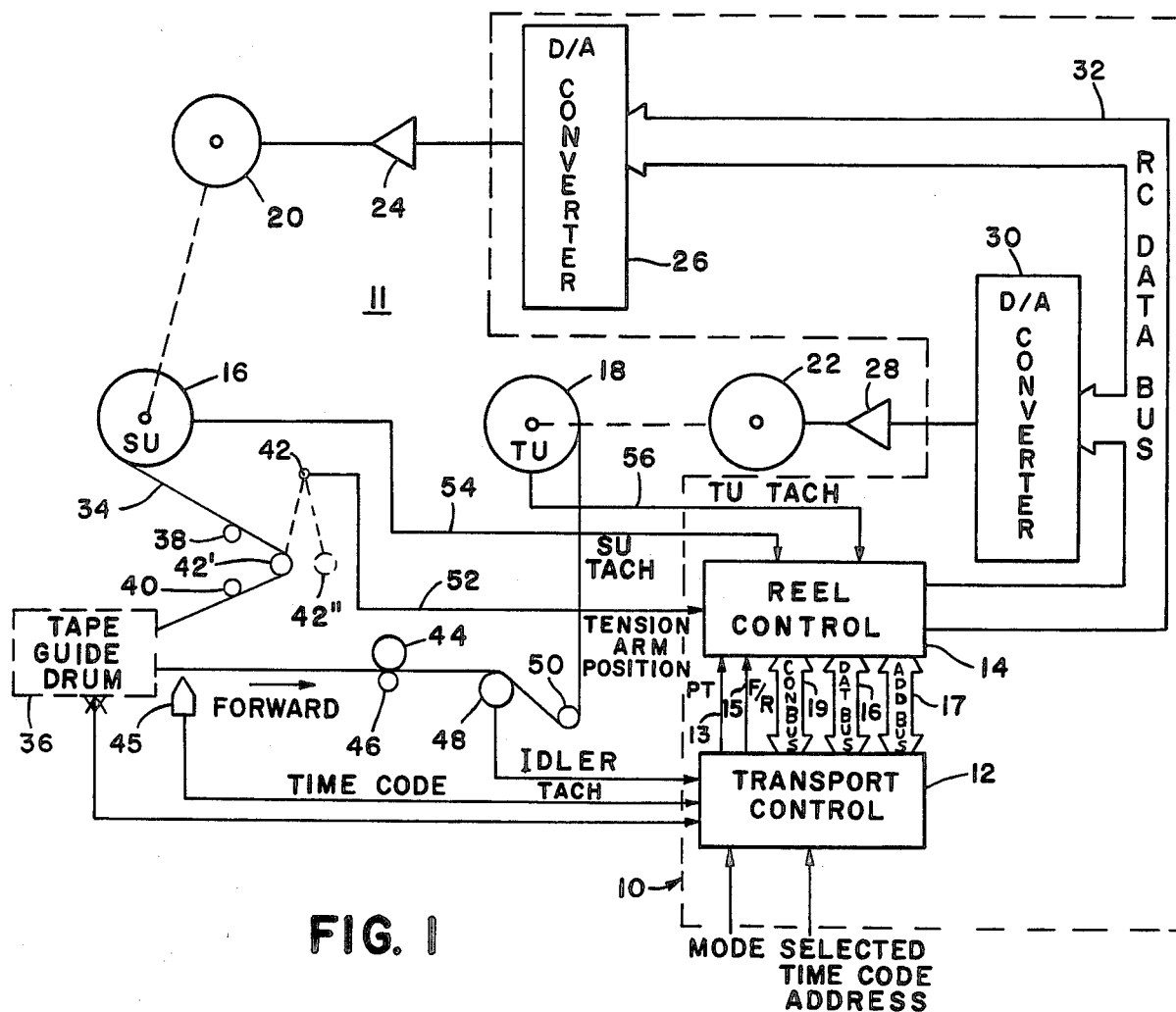
FIG. 1
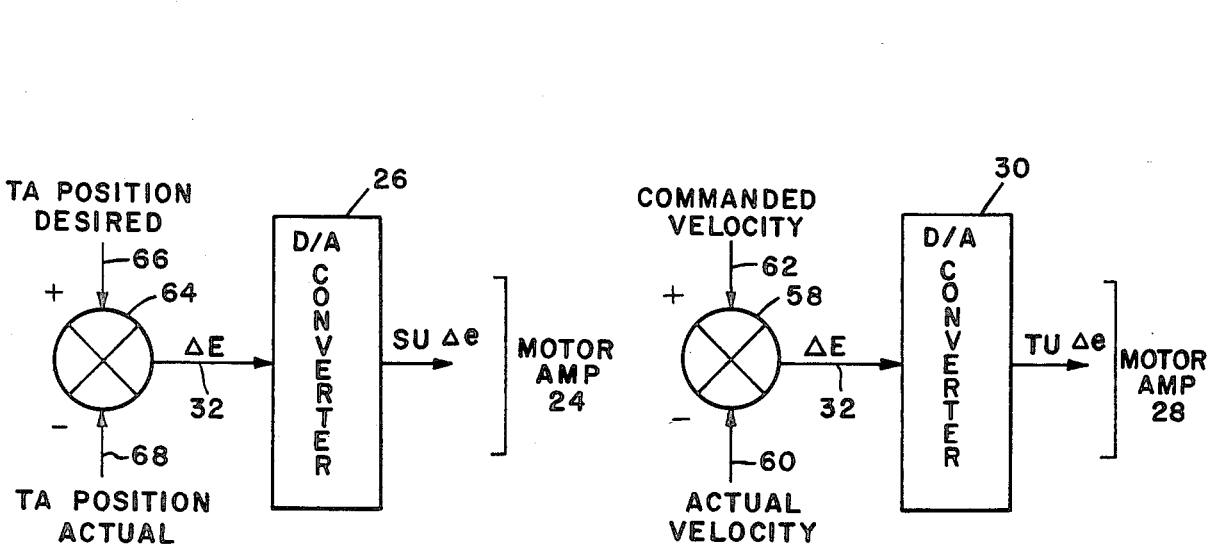
FIG. 2
FIG. 3

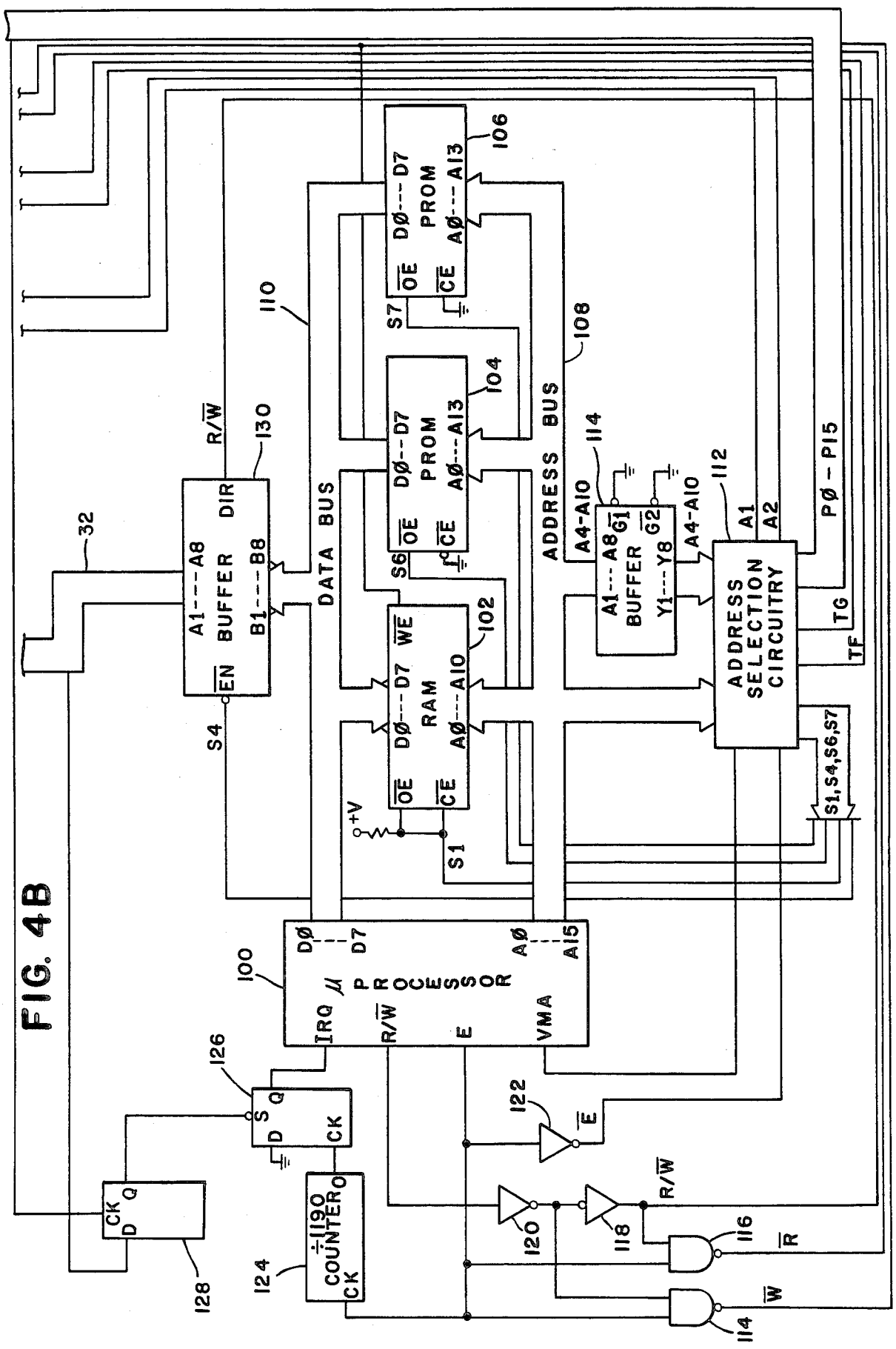

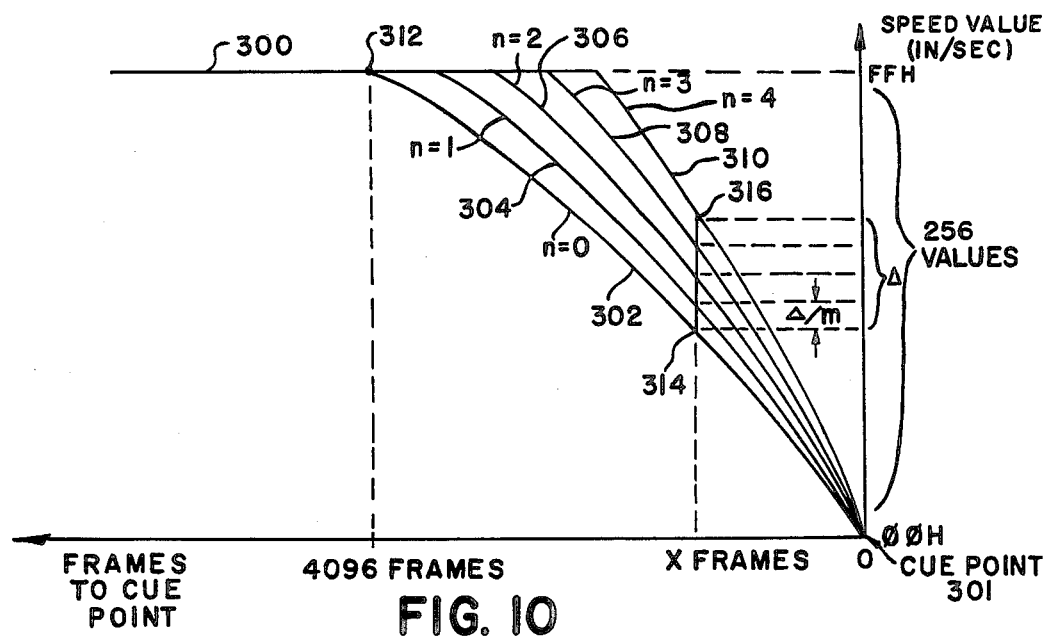
FIG. 10
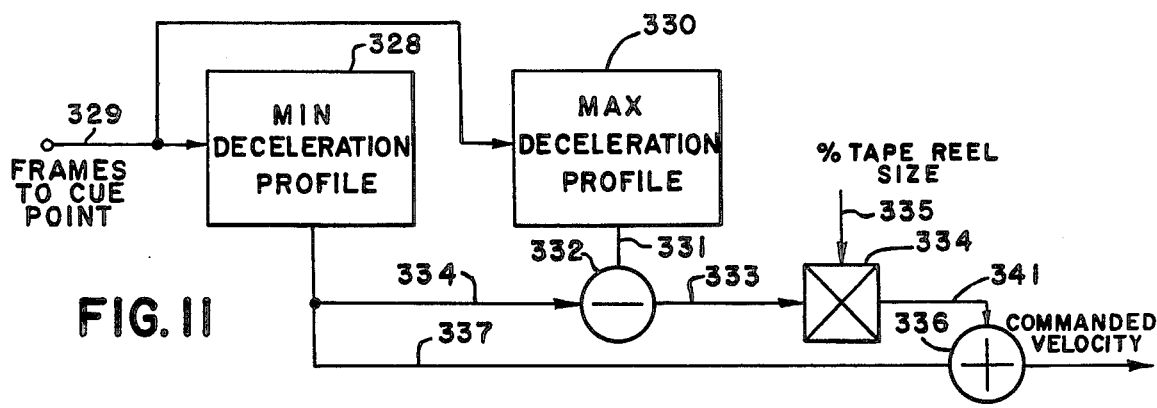
FIG. 11
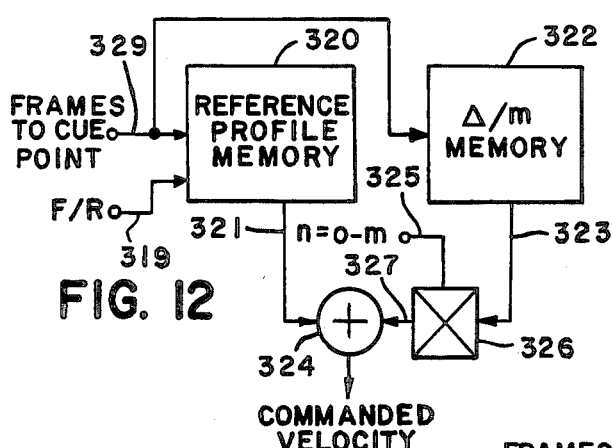
FIG. 12
FIG. 13
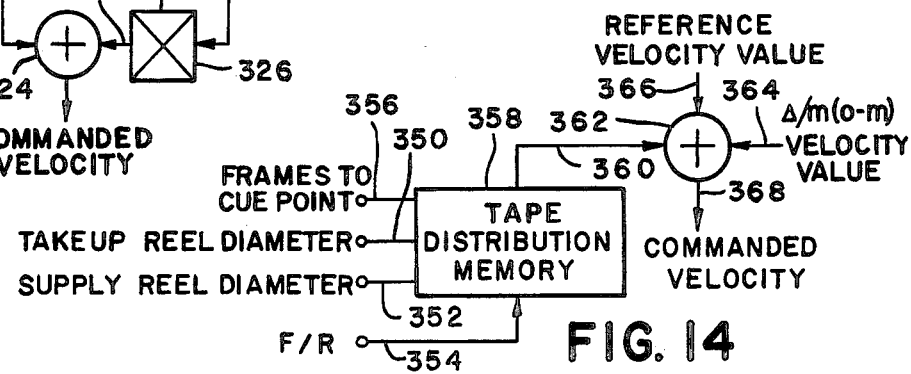
FIG. 14

CUE REFERENCE TABLE

| DTC | |
|---|---|
| 4095 | 16 VELOCITY VALUES |
| 2048 | |
| 2047 | 16 VELOCITY VALUES |
| 1024 | |
| 1023 | 16 VELOCITY VALUES |
| 512 | |
| 511 | 256 VELOCITY VALUES |
| 256 | |
| 255 | 256 VELOCITY VALUES |
| 0 | |

FIG. 15

CUE DELTA/m TABLE

| DTC | |
|---|---|
| 4095 | 16 VELOCITY VALUES |
| 2048 | |
| 2047 | 16 VELOCITY VALUES |
| 1024 | |
| 1023 | 16 VELOCITY VALUES |
| 512 | |
| 511 | 256 VELOCITY VALUES |
| 256 | |
| 255 | 256 VELOCITY VALUES |
| 0 | |

FIG. 16

CUE REFERENCE TABLE (REVERSE)

| DTC | |
|---|---|
| 31 | 32 VELOCITY VALUES |
| 0 | |

FIG. 17

TAPE PACK DISTRIBUTION CORRECTION VALUES

| DIST | |
|---|---|
| 511 | 256 CORRECTION VALUES |
| 256 | |
| 255 | 256 CORRECTION VALUES |
| 0 | |

FIG. 18

TAPE PACK DISTRIBUTION CORRECTION VALUES (REVERSE)

| DIST | |
|---|---|
| 511 | 256 CORRECTION VALUES |
| 256 | |
| 255 | 256 CORRECTION VALUES |
| 0 | |

FIG. 19

METHOD AND APPARATUS FOR TRANSPORTING A RECORDING MEDIUM WITH AN ADAPTIVE VELOCITY CHANGE PROFILE

The invention pertains generally to a method and apparatus for transporting a recording medium for storing information, and is more particularly directed to transport apparatus which vary the recording medium transport control for different operating parameters which affect the movement of the medium.

Many large capacity information storage systems employ a record medium for storing information in the form of a recorded representation of the original information. In these storage systems, the record medium usually has a plurality of uniformly sized and spaced discrete storage locations and is moved by a transport apparatus operated to position a particular one of the storage locations relative to a suitable means for recording or reproducing information on the medium. The information can be from any type of information processing system and the transport apparatus is used to access the locations so that the reproducing or recording can be accomplished.

In information storage systems employing a transported record medium, the access time for any particular storage location depends upon how quickly the medium can be transported to position the requested storage location in relationship to the means for recording and reproducing the information. Generally, for a particular transport mechanism, the access time will be the shortest possible if the record medium is accelerated for one-half the distance to the requested storage location and then is decelerated the other half of the distance with the acceleration and deceleration segments joined to provide a substantially parabolic speed trajectory. However, because the highest possible speed which a record mediumm can be transported is limited by the maximum velocity of the transport mechanism, it is not always possible to maintain the acceleration curve of the record medium once that terminal velocity is reached. Even when the record medium reaches a terminal velocity, the access time of a particular location will be shortest if the recording medium is accelerated and decelerated along parabolic speed trajectories connected by the maximum velocity value thereby transporting the medium at the highest average speed available. The transport should be accomplished without having to reverse the direction of the movement in order to not take time to stop, decelerate and accelerate the recording medium to the selected access point.

In a tape transport mechanism in general, and for apparatus which position magnetic tapes storing video images, in particular, accessing a selected storage location on the recording medium is important in the editing process. During editing, the step of advancing the tape to within a fixed distance of a desired image on the tape is termed cueing. Once the tape has been positioned, the image can then be transferred to a master tape by synchronizing its reproduction from the cued tape with its recording on a master tape. The professional editor needs a system which will cue to a particular location quickly and provide crisp parking at that location. When the system is slow in reaching a cue location or constantly overshoots and has to backtrack to the selected location, all of this time is wasted by the editor. A busy editor has a multiplicity of cue locations which to access on many source tapes before producing a program master tape. A slow cue mode on a video tape transport can drastically limit editing efficiency in this situation. Further, a professional editor must be able to handle different sized video tape reels on a transport. In the past this has created a problem because a change between reels of a different size varies the inertial loading on the transport system, and thus, the manner in which the transport system responds to tape transport commands particularly during deceleration.

When in a cue mode, the transport apparatus positions the video tape relative to a means having magnetic heads for transferring information, by either recording or reproducing, between the tape and a suitable information processing system. Prior art cue systems provide for an input of a cue point or location on the magnetic tape to which the transport is directed. The tape transport then accelerates the tape in the correct direction until it reaches the maximum velocity that can be obtained by the mechanism. In this shuttle operation, the tape is transported to within a certain number of locations from the cue point and then decelerated down a fixed deceleration profile. This fixed deceleration profile is designed according to the square law or parabolic trajectory discussed above and is based upon the particular deceleration characteristic or ballistics of the transport used. Examples of such cueing systems with a fixed deceleration profile are found in U.S. Pat. Nos. 3,736,565; 3,681,523; and 3,641,504. These references are all commonly assigned with the present application and the disclosure of which is hereby incorporated by reference herein.

In another type of cue position control, a tape is transported to approach a cue point at a maximum velocity until it is within a predetermined distance of the cue point. From that predetermined distance to the cue point, the velocity of the tape is reduced dramatically, such that the cue point is approached very slowly and the tape can be stopped when the selected location arrives at the position. This action is taken so that the tape will not overshoot the selected location. An example of this type of control is used in a video tape recorder, model BVH 2000, manufactured by the Sony Corporation.

A microprocessor based reel servo control system for a video tape transport is illustrated in U.S. Ser. No. 364,652 filed on Apr. 2, 1982 in the name of Kenneth Louth. The reference to Louth is commonly assigned with the present application and the disclosure of which is hereby incorporated by reference herein. Louth describes a reel servo system for transporting a video tape using dual servo control loops. A velocity servo system is utilized on the takeup reel for foward and reverse shuttle operations. In the shuttle modes, a supply reel control loop is a servo loop based on tension arm position. In this manner, the tape velocity is controlled by the takeup reel servo and correct tensioning of the transported tape is provided by the supply reel servo.

In these apparatus, the transport of tape is governed by many different physical parameters while being moved along the tape path of a transport mechanism. These parameters, generally termed the ballistics of tape transport, govern how quickly and in what manner the tape can be accelerated or decelerated. Generally, the parameters which govern the ballistics of tape transport can be divided into three major categories comprising elements of the tape and transport relating to mass, elements relating to the frictional or drag forces on the tape during transport, and element affecting the force or torque applied to the tape mechanism from the reel motors.

The mass parameters for a particular machine include the size of the tape reel, the mass of the moving parts of the transport mechanism, and the distribution of the tape pack. The more massive any of these elements are, the slower the transport can accelerate and decelerate the tape for a given torque. The elements contributing to the frictional or drag force on the tape transport include the direction of movement of the tape which varies because of the different positions of a tension roller arm. Further, elements of the transport contributing to the drag are the mechanical design of the machine and the manner in which it ages and other tolerance variations in manufacture. The elements of force and torque on the tape are directly related to the type of servo control which is used on the transport and on the capacity of the reel drive motors. The greater the force that can be applied to a transport, the faster a tape can be accelerated and decelerated up to a maximum torque which will produce a maximum velocity for the transport.

It should be appreciated that the prior art transport mechanism discussed previously transport tape along a path with respect to a reference point without adaptively modifying the acceleration-deceleration characteristics of the transport for changes in these ballistics parameters. The art considers the ballistics parameters related to the tape movement of a particular transport to be fixed which provides a less than optimum acceleration-deceleration profile for the transport of tape. Because of the factors described above relating to the editing function of a video tape transport, it would be very desirable to adaptively modify the velocity profile of the movement of tape for variations in the ballistics parameters thereby optimizing tape transport for a particular machine.

SUMMARY OF THE INVENTION

The invention provides a transport apparatus, and a method of controlling that transport apparatus, which is adapted to move a recording medium along a path past a recording/reproducing means according to a velocity change profile which is selected according to a ballistics parameter of the transport apparatus. Preferably, the ballistics parameter changes which will be compensated for in the illustrated mechanism are variations in mass or loading inertial and the frictional or drag force on the recording medium. The recording medium, a video tape which is used for exemplary purposes, has a velocity profile selected based on variations in system mass including tape reel size and tape pack distribution. The velocity profile is further selected for variations in the frictional or drag forces on the tape determined by tape transport direction. These parameters, although not exclusively, are the major contributors to variations in the tape transport ballistics for any transport. Compensation of the velocity profile of a tape transport apparatus for these factors will substantially produce an optimum velocity profile.

The invention comprises means for calculating the distance to a preselected location, means for generating a commanded velocity signal as a function of the calculated distance to the preselected location and as a function of a ballistics parameter of the transport of tape, means for determining a ballistics parameter of the transport, and means, responsive to the commanded velocity signal, for nulling the difference between the actual velocity of the recording medium and the commanded velocity.

In one preferred embodiment, a transport control is described providing a cue control for a video tape transport whose ballistics parameter relating to mass varies as a function of the size and distribution of the tape pack. A cue mode is provided for the tape transport where it must move a tape from one location with respect to a recording/reproducing means to another preselected location and park the tape there in the shortest time possible. Advantageously, this function of moving the tape to the cue point or the preselected location is accomplished without overshooting the desired stopping location and without producing excessive decelerations on the tape which, for a magnetic information storage medium, could cause a loss of information stored therein.

The transport control apparatus performs the cue function by controlling the velocity of the tape transport with a commanded velocity signal. The commanded velocity signal is differenced with an actual velocity signal and an error signal generated to a motor servo controlling the motion of the takeup reel of the tape transport. The motor servo acts to null the error signal in order to provide an actual velocity which is equal to the commanded velocity.

When the tape transport is placed in a cue mode, the means for generating the commanded velocity signal are enabled. The commanded velocity is generated as a function of the distance that the tape is away from the cue point to provide velocity control for parking the tape at the cue point in the shortest or most optimum amount of time. The function of distance used is one which generates a commanded velocity which is the maximum speed that the tape can travel until it is within a predetermined distance fron the cue point. Thereafter, the function is a velocity profile which decelerates the transport with an adaptive deceleration based on a measured ballistics parameter of the transport. Because the ballistics of the transport of tape will vary with the amount of tape pack or inertial loading, the deceleration profile which is used is adapted to the size of the reels which are being transported.

In an illustrated apparatus embodying the invention, a dual memory system is used to generate the commanded velocity value. A first memory means stores values of velocity as a function of the distance to the cue point for the maximum inertial loading or largest tape pack. Since the largest tape reel will increase the inertial loading on the transport the most, this is the worst case deceleration profile that is needed by the system. It is the slowest profile that the system will use and its intersection with the maximum velocity value indicates the predetermined distance away from the cue point at which the apparatus must switch from a maximum velocity to the adaptive deceleration profiles.

A second memory means stores differential values of velocity as a function of the distance to the cue point. The differential velocity values are the difference between the velocity of the fastest deceleration profile which the ballistics of tape transport can realize for the lightest inertial loading and the velocity of the slowest deceleration profile for the heaviest inertial loading at similar distances to the cue point.

Accordingly, the transport control apparatus generates the commanded velocity signal adaptively when the distance to the cue point is within the velocity profile region by addressing the first memory means with the distance to the cue point to obtain a worst case velocity value and then addressing the second memory means to obtain a differential velocity value corresponding to that distance. A proportional amount of the differential value is calculated based on the measured ballistics paramenter and then added to the worst case value. For reel size, the proportion of the differential value which is added is based on the proportion that the actual tape pack is of the maximum tape pack. This proportion is indicative of the actual inertia or ballistics parameter related to mass seen by the system.

In the preferred implementation, the addition of a fraction or proportional part of the differential velocity value to the reference velocity value is accomplished by an incremental iteration process. The iteration process is used in the implementation because the transport control apparatus is microprocessor based and such can be accomplished in less machine cycles than a proportioning calculation that would require multiplication and division for generation of the command velocity value.

The incremental iteration process comprises measuring the tape pack on the supply and takeup reels and combining them to determine a total actual tape pack which is assigned an integer number m from 0 to m (MAX). The integer assigned is based upon the fraction that the total tape pack is with respect to the difference between the maximum and minimum tape reel sizes where this range has been divided into equal increments and where each increment corresponds to an integer. A maximum tape reel size is assigned the integer 0 and the minimum tape reel size is assigned the integer m (MAX). The closest integer value for the actual tape pack without describing an inertial load less than the actual pack is assigned by this method. As will be seen hereinafter, it is important to assign the integer for the next larger tape pack when between increments because the integer for the next smaller tape pack will produce a velocity deceleration profile which will cause the transport to overshoot. It is very undesirable for the transport to overshoot as then the apparatus must be stopped completely and its direction reversed in order to park at the cue point.

The incremental process, instead of storing the differential velocity values in the second memory means as a function of distance from the cue point, stores the differential value divided by the constant m (DELTA/m), where m is the number of increments into which the range has been segmented and is equal to m (MAX). When calculating the commanded velocity value by the iterative process, the transport apparatus first obtains the velocity value corresponding to the maximum reel size from the first memory means and then adds to that value the incremental value stored in the second memory means n times. If the actual reel size is the maximum, then the commanded velocity value is the reference velocity value since n=0. If the actual reel size is the minimum size, then the velocity value is the reference velocity plus the differential value or the maximum velocity since m=m(MAX)=m. For actual tape packs between n=0 and n=m(MAX) the commanded velocity is a proportional value between the maximum and minimum values based upon the value of the integer.

In an additional feature, the velocity values stored in the first memory means may be replaced with the velocity values of a third memory means. The control apparatus selects the values of the memories to be used depending upon which direction the tape is approaching the cue point. This feature is advantageously used in tape transport apparatus which have a different ballistics parameter depending frictional or drag loading, for example, when a tension arm is placed in proximity to only one of either the takeup or supply reels of the transport and the reel servos are based on different operating parameters.

As still another feature of the invention, the velocity change profile may be adaptive with respect to the tape pack distribution on the reels during the cue mode of operation. The ballistics parameters of tape transport are affected by tape pack distribution because the mass seen by the reel drive motors varies as the distribution varies. The velocity values for a correction based on distribution are stored in a fourth memory means which is accessed by the actual tape distribution and the direction of transport. The velocity values are combined with the commanded velocity values to produce a variation in the velocity profile of the transport based on tape pack distribution.

These and other objects, features, and advantages of the invention will become more apparent and clearly understood from a reading of the following description with reference to the accompanying drawings in which:

BRIEF DESCRIPTION OF THE DRAWINGS

FIG. 1 is a system block diagram of tape transport apparatus for a video recording/reproducing system which is constructed in accordance with the teachings of the invention;

FIG. 2 is a schematic block diagram of the supply reel servo for the tape transport apparatus illustrated in FIG. 1;

FIG. 3 is a schematic block diagram of the takeup reel servo for the tape transport apparatus illustrated in FIG. 1;

FIGS. 4A and 4B together comprise a detailed electrical block diagram of the reel control for the tape transport apparatus illustrated in FIG. 1;

FIG. 10 is a pictorial representation of a family of curves, each describing commanded velocity as a function of the distance to the cue point and illustrating an adaptive velocity change profile;

FIG. 11 is a block diagram of a first embodiment of circuitry for generating a commanded velocity value based on an adaptive velocity change profile;

FIG. 12 is a block diagram of a second embodiment of circuitry for generating a commanded velocity value based on an adaptive velocity change profile;

FIG. 13 is a block diagram of circuitry for iteratively adding incremental velocity values to the reference velocity value for the embodiment illustrated in FIG. 12;

FIG. 14 is a partial block diagram of a third embodiment of circuitry for generating a commanded velocity value based on an adaptive velocity change profile;

FIG. 15 is a pictorial representation of the format of the reference velocity values stored in the reference profile memory illustrated in FIG. 12;

FIG. 16 is a pictorial representation of the format of the incremental velocity values stored in the DELTA/m memory illustrated in FIG. 12;

FIG. 17 is a pictorial representation of the format of the reverse transport direction reference velocity values stored in the reference profile memory illustrated in FIG. 12;

FIG. 18 is a pictorial representation of the format of the tape pack distribuition correction values for the forward direction stored in the tape distribution memory illustrated in FIG. 14;

FIG. 19 is a pictorial representation of the format of the tape pack distribution correction values for the reverse direction stored in the tape distribution memory illustrated in FIG. 14;

DETAILED DESCRIPTION OF THE PREFERRED EMBODIMENT

Figure 4A:
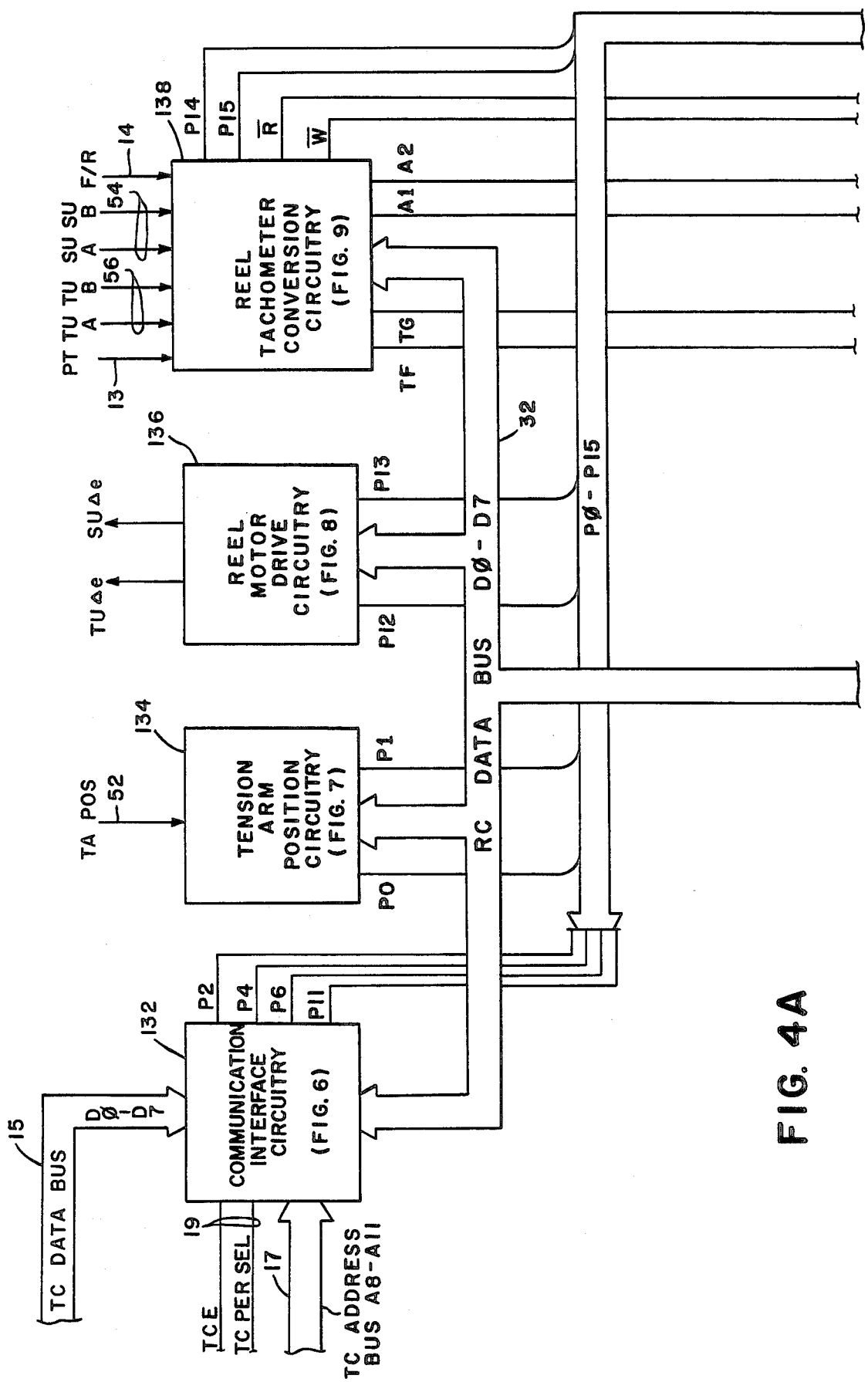

Referring now to the drawings which illustrate several embodiments of the invention and disclose an apparatus, and a method for controlling the apparatus, using an adaptive velocity change profile for accelerating and decelerating the movements of a recording medium under various operating conditions. In the preferred embodiment, a video tape transport having a cue mode will be described to disclose a deceleration profile which is selected in response to variations in ballistics parameters of the tape transport caused by tape reel size, tape transport direction, and tape pack distribution.

In the several drawings like reference characters will be used to describe identical elements. Moreover, the convention of describing logic signals having a low level as their true state by preceeding the signal name with an * symbol will be used.

FIG. 1 illustrates a tape transport apparatus constructed in accordance with the teachings of the invention. The tape transport apparatus includes a transport control system 10 that controls a tape transport mechanism 11 to move a tape 34 along a defined tape transport path. The transport control system 10 includes generally a transport control 12 and a reel control 14 which measure and input various signals from the tape transport mechanism 11 and provide control signals to reel motors 20 and 22 to produce controlled movement of the transported recording medium which, in this case, is the magnetic video tape 34. The transport control 12 generally acts as a master controller to receive commands from an operator through a control panel and various signals from other portions of apparatus. The control 12 processes the received signals, and distributes control and other commands and timing signals to various subsystems of the transport control system 10. The reel control 14 generally acts as a servo for the reel motors 18, 20 of the transport mechanism 11.

The tape transport mechanism 11 includes a supply reel 16 for storing the recording medium thereon, which is rotated by the reel motor 20 in response to an analog signal supplied by a motor drive amplifier 24. The analog signal received by the reel motor 20 is the result of the reel control 14 outputting a digital control word on the reel control (RC) data bus 32, which is then converted to an analog signal by a digital to analog (D/A) converter 26. Similarly, a takeup reel 18 for storing the recording medium thereon is rotated by a reel motor 22 which is driven by an analog signal supplied by a motor drive amplifier 28. The input to the motor amplifier 28 is via a D/A converter 30 which receives a control word from the reel control 14 via the RC data bus 32.

The reel motors 20 and 22 are preferably DC motors which will rotate the takeup and supply reels either faster or slower depending upon the amplitude of the analog signals input to them and in a forward or reverse direction, depending upon the polarity of the analog signals. If a motor is rotating in the opposite direction for the polarity of the analog signal applied to it, then a braking current will be developed by the motor until it stops and reverses. Thereafter, the motor will be accelerated to the amplitude value of that signal.

The transport control system 10 generates the control signals to the reel motors from two servo loops which independently control the output to each motor. The servo loops each use a number of different feedback signals from the transport mechanism 11 to produce the control signals. The reel control 14 receives a takeup reel tach signal, TU TACH, via a line 56 from a tachometer operatively linked to the takeup reel 18. The TU TACH signal is in the form of a pair of sinusoidal waveforms in quadrature, which is used by the reel control 14 to provide information as to the takeup reel velocity, direction of rotation, and tape pack diameter. The frequency of the waveforms are proportional to the rotation rate of the takeup reel. Similarly, a tachometer operatively linked to the supply reel 16 provides to the reel control 14 via line 54 with a pair of quadrature signals forming the supply reel tach signal, SU TACH, which indicates the supply reel velocity, direction of rotation, and tape pack diameter.

Further, the reel control 14 receives a signal from a position sensor operatively linked to a pivoted arm 42 of a tape tension control mechanism to indicate its position via a signal line 52. The pivoted tension arm 42 is biased by a restoring spring at one of two reference positions, that shown at 42' and that at 42", where the first is a low tension position serving as the reference when the tape is transported in the forward direction and the second is a high tension position serving as a reference when the tape is transported in the reverse direction. The tension arm moves away from the reference position under the influence of tension variations in the transported tape over an error range which the position sensor indicates to the reel control 14. Further, a signal indicating tape direction and tape speed is input from a tape tachometer attached to an idler roller 48. This idler tach signal is input to the tranport control 12 to provide an indication of the actual speed and direction of the tape. The transport control 12 further receives signals initiated by an operator indicating the mode of operation of the transport control system and the selected storage location on the tape to be positioned relative to a reference point along the path of transport of the tape 34.

The reference point is generally, in a video tape recorder, the record/reproduce head. In a helical scan tape recorder the record/reproduce head is carried by the tape guide drum and the position is adjusted so that the reading of information from and writing of information to the tape is accomplished along a track skewed at an angle to the longitudinal axis of the tape. When a video tape recorder is used in a cue mode the selected location is moved within a predetermined distance of the reference point. This provides for the selected location to be positioned or parked a set number of frames upstream of the record/reproduce head. Upstream is, of course, on the supply reel side of the tape guide drum 36 for a forward direction and on the capstan side of the tape guide drum 36 for a reverse direction. Typically, this set distance is about seven frames and allows for the tape transport mechanism to be accelerated up to reproducing velocity by the time the selected location is at the record/reproduce head. The reproduction of the selected location can then be conveniently synchronized with its recording on a master video tape recorder during an editing function.

The transport control 12 reads a time code from the tape 34 which indicates the positions of the storage locations on the tape relative to a reference point. The time code, applied to a longitudinal track on the tape is read from the tape 34 by a conventional magnetic read head 45. In the illustration, the code is a SMPTE code identifying pairs of fields in a video image. In a type C helical scan video tape recorder the identification of a pair of fields identifies each particular track on the tape. The SMPTE time codes for a type C recorder are in the format of hrs., mins., secs., and frames and provide a convenient method of determined tape location. The time codes are reproduced by the read head 45 and then processed by the transport control 12. The processed time codes are converted to binary numbers for determining the distance to the cue point in units of frames.

The transport control 12 develops several signals which are transferred to the reel control 14 as digital words over a data bus 16 in concert with control and selection signals from an address bus 17 and a control bus 19. The reel control 14 communicates with the transport control 12 to receive commands and data while it replies with an acknowledgement for the data passed to it and status information. The reel control 14 upon interrogation by the transport control 12 indicates the operating condition of the reel servos and their status as locked or unlocked. The primary information transmitted to the reel control for the purpose of the present invention is the two bytes of digital information indicating the distance to the cue point. This distance is calculated as the difference of the time codes being read by the head 45 and the time code input by the operator selecting the cue location. As will be more fully described hereinafter, the distance to the cue point is provided as a two-byte digital word indicative of distance in units of video frames. The data, control, and address buses are those of a microprocessor included in the transport control 12 which regulates operation of the transport control.

In addition, the transport control 12 generates with discrete circuitry the signals PT via line 13 and F/R via line 15 to the reel control 14. The signal PT is a processed tachometer signal derived from the idler roller tach and has a frequency equal to 4 times the idler tach signal received by the transport control 12. The PT signal is used as a timing signal indicative of how fast the tape is moving, while the F/R signal is also derived from the idler roller tach and is used to determine the direction of tape movement i.e., either forward or reverse.

When transported in a forward direction, the tape 34 is unwrapped from the supply reel 16 and is guided along the tape transport path by an idler guide roller 38 to engage another idler guide roller at the end of the tension arm 42 before being directed further along the tape transport path by another idler guide roller 40. After leaving the guide roller 40, the tape passes helically about a cylindrical tape guide drum assembly, shown schematically at 36.

In a type C helical scan video tape recorder, the tape guide drum mounts or carries a record/reproduce head which rotates in a plane about the central axis of the drum. Because of the helical wrap of the tape 34 about the drum, the rotation of the head (not shown) will trace recording/reproducing tracks along the tape at an angle to the longitudinal axis of the tape. In general one video field of information is stored on each track during a rotation of the head in the plane. The tape moves along this axis or path and moves the track areas past the head for the operations of recording or reproducing. It is evident that if certain information is to be reproduced from or recorded onto selected tracks of the video tape, then the plane of rotation for the record/reproduce head will be defined as a reference point for positioning a tape. As mentioned previously, because of the need to synchronize the tapes in the cue step of editing, the rotating plane of the record/reproduce head will be ahead of the reference point for positioning a tape when used in this mode.

After the tape 34 exits the tape guide drum 36, it passes the time code reproduce head 45 before reaching a capstan 44, which engages the tape in cooperation with a pinch roller 46 on the opposite side of the tape. The tape then engages the idler roller 48 operatively linked to the tape tachometer and, after leaving this roller, is guided by another idler guide roller 50 onto the takeup reel 18. As noted earlier, the direction of tape movement along the path from the supply reel 16 to the takeup reel 18 is defined as the forward direction of tape transport. Normally, this is the direction that the tape moves during recording or reproducing, and the pinch roller and capstan are engaged to facilitate tape movement.

When it is determined by an operator, however, to move the tape to a selected location relative to the rotating record/reproduce head carried by the guide drum assembly 36, then the apparatus is placed in a cue mode. In this mode, the pinch roller 46 is disengaged from the capstan 44 and the tape 34 is transported at a velocity determined and controlled by the reel control 14. The tape 34 can be transported in either the forward or reverse direction in this mode to produce the movement of tape to any storage location on the tape which the operator desires. More specifically, the SMPTE time code address of the storage location selected by the operator is input to the tranport control system 10 through manipulation of operator controls. The transport control system responds to position the selected location on the tape at the cue point in the shortest time available. The cue operation will use the maximum shuttle velocity of the transport apparatus until the selected location reaches a position that is a predetermined distance away from the cue point. After this predetermined position is reached, the transport control system 10, according to the present invention, uses an adaptive deceleration velocity change profile to cause the transport mechanism 11 to slow the tape 34 to a zero velocity when the selected location reaches the cue point and, thereby, stop the tape with the selected location at the cue point. This advantageously provides the most optimum or shortest time to cue the tape 34 with a particular tape transport mechanism 11. The adaptive profile is determined by the ballistics parameters of the particular tape transport mechanism with which it is incorporated. By modifying the deceleration profile for changes in transport ballistics parameters, a smooth and even velocity change is achieved without the selected location being transported beyond, or overshooting, the cue point.

It is evident that the transport control 12 and reel control 14 form a control system 10 to control the tape transport not only with respect to tape movement but also with respect to control of the helically wrapped tape guide drum for recording and reproducing video images on the tape 34. These additional modes of the transport control system 10 are discussed and described in the referenced Louth application and the other applications cited therein. Only the cue mode has been retained for discussion in this application to clarify its operation and provide a detailed explanation of the present invention. However, it should be understood that this invention is operable and integrated with the other operations described in those referenced applications.

The two servo loops, one for the supply reel 16 and one for the takeup reel 18, will now be more fully described with respect to the servo block diagrams of FIGS. 2 and 3. When the reel control 14 is operating in the cue mode, the takeup reel 18 is controlled by a velocity servo loop as illustrated in FIG. 3. The velocity servo loop uses the tachometer pulses provided by the tape tachometer associated with the idler roller 48 to generate a signal representative of the actual tape speed and compares that signal to a reference velocity command provided according to a velocity change profile, as will be described hereinafter in further detail. As shown in FIG. 3, the tape tachometer pulses are converted to an actual velocity digital signal on line 60, which is input to a summing junction 58 having another input that receives a reference commanded velocity digital signal via a line 62. The commanded velocity and the actual velocity are differenced in the summing junction 58 to produce a digital error signal which is converted to the analog error signal TU DELTA e which controls the drive provided to the motor amplifier 28. In this manner, the primary control of the velocity of transport of the tape 34 is achieved through the control of the drive supplied to the takeup reel.

As discussed briefly hereinbefore, the commanded velocity signal is generated in the cue mode by a means responsive to the distance that the selected location on tape is away from the cue point. When the selected location is at a distance in excess of a predetermined distance, the tape 34 is moved at an extremely high or shuttle velocity corresponding to the maximum velocity at which the tape can be transported by the transport mechanism 11, and this maximum or shuttle velocity is used for the commanded velocity signal reference provided on line 62. When, however, the selected location is at distance from the cue point less than the predetermined distance, the commanded velocity reference signal provided to the velocity servo loop in generated according to a deceleration velocity change profile to reduce the commanded velocity and, hence, the velocity at which the tape is transported along the tape transport path. This operation of the velocity servo loop enables accurate control of tape transport during cueing operations and precise positioning of the tape relative to the cue point.

When the tape 34 is transported during cueing operations in either direction, the supply reel 16 is controlled by a position servo loop as shown in FIG. 2. In the forward direction of transport, the tension arm is moved to the position indicated at 42'', which decreases tension on the tape, such that the takeup reel will pack or wind tape thereon with a nominal predetermined tension. When the tape 34 is transported in the reverse direction, the tension arm 42 is moved to the position 42' to increase the tape tension. This has the effect of overcoming the increased slack in the tape caused by the takeup reel pushing tape. The increased tension causes the tape to pack with the correct predetermined tension on the supply reel because if the forward direction tension were used, the tape would pack too loosely.

In this manner, the correct tension load is maintained on the takeup reel velocity loop, and the supply reel motion is controlled as a function of the position of the tension arm for either direction tape transport. It should be appreciated that while the dynamic ballastics parameters determining the mechanics of motion of the tape 34 in the forward direction of the transport are quite different from those determining the mechanics of tape motion in the reverse direction, the switching of the tension arm reference from side to side results in these dynamic parameterms being somewhat comparable to one another.

The supply reel servo operates to insure that during cue the tape 34 is not being transported too rapidly for either the takeup or supply reel. Thus, after the tension arm is appropriately located to provide proper tape tension for packing the tape onto one of the reels according to the direction of tape transport, the limits of movement of the tension arm to maintain the desired tape tension are set. These limits are preferably different for each direction of tape, because of the aforementioned differences in the friction load for the opposite directions of tape transport. As the tape is transported, any movement of the tension arm beyond one of these limits causes the supply reel drive to be adjusted to return the tension arm to a position within the limits, which returns the tension on the tape to the required amount. The actual position of the tension arm provided by the arm position sensor is input to a summing junction 64 via line 68. This input is differenced with a desired tension arm position signal input via line 66 to yield a digital position error signal, SU DELTA e. The digital error signal is converted by the D/A converter 26 to drive the motor amplifier 24.

The reel control 14 will now be more fully described with reference to FIGS. 4A–B. The reel control 14 is a microprocessor based controller having as the main component a microprocessor 100 (FIG. 4B). The microprocessor can be any type of single chip integrated circuit model microprocessor, but in this implementation, it will be shown as a model MC6802 commercially available from the Motorola Corporation of Schaumburg, Ill. The pin designations of the microprocessor 100 illustrated are those of the MC6802. It will be appreciated that the operational characteristics of this device are well known and are more fully described in the user manual for the MC6802 which is available from the manufacturer.

The microprocessor 100 executes a stored program to provide the needed operations to bring the necessary input signals into the processor and to generate the necessary control signals for the reel motors. The program which the microprocessor 100 executes is stored in two programmable read only memory PROMS 104, 106. The microprocessor 100 addresses these memories by the connection of selected lines of its address bus 108, having address lines A0–A15, to the address inputs A0–A13 of the PROMS. The data bus 110 of the microprocessor 100 is also extended to the D0–D7 outputs of the PROMS 104, 106 to receive the program instruction data executed by the microprocessor 100.

Selected lines of the address bus 108 also extend to address selection circuitry 112. Address lines A1, A2, A13–A15 are directly connected to the address selection circuitry, while other address lines A4–A10 enter the address selection circuitry 112 through a buffer 114. The address selection circuitry 112 generates a number of address block selection signals S1, S4, S6 and S7; a number of timer select signals TF, TG; and a number port selection signals P0–P15. By generating these signals, the address selection circuitry 112 is able to select different memories and input/output devices which are mapped into the memory space of the microprocessor 100. The address selection circuitry, therefore, generates each one of these selection signals by decoding combinations of address signals placed on the input address lines.

Thus, to read an instruction from the PROMS 104 and 106 into the microprocessor 100 for execution, the microprocessor first sets an address on the address bus 108, which selects one of the PROMS. In the case of PROM 104, this is accomplished by generating the address block selection signal S6 and for PROM 106, this is accomplished by generating the block selection signal S7. After the particular device has been enabled, the microprocessor 100 addresses the particular location from which it desires to read program instruction data and the contents from that location are input to the microprocessor 100 via the data bus 110. The microprocessor 100 then executes that instruction and thereafter fetches another in the same manner. Thus, the stored program in the PROMS is used to control the system in a conventional fetch-execute cycle. It is understood that the instructions of the program stored in the PROMS 104 and 106 can be more than one memory location in length.

During the execution of the system program, particular constants and intermediate calculations can be stored in a random access memory 102, which is accessed in a manner similar to the PROMS 104, 106. The RAM memory 102 has its address inputs A0–A10 coupled to similarly labeled address lines of the address bus 108. The D0–D7 bidirectional data ports of the memory 102 are connected to the data bus 110. Information is read from RAM 102 by first selecting the device with a address block selection signal S1, which is commonly applied to the output enable OE and chip enable CE terminals of the device. Then a particular location to be read is addressed, and the data stored in that location is applied to the data bus 110 where it can be read into the microprocessor 100. For writing into the RAM 102, the same process of enablement is accomplished with the addition of bringing the write enable WE terminal to a low logic level via the write signal *W.

The write signal *W is output from a NAND gate 114, which decodes the coincidence of the inversion of the read/write R/*W output of the microprocessor 100 and the occurrence of the clock signal E obtained from a high speed internal clock signal provided by the microprocessor 100. Further, in connection with the R/*W output of the microprocessor 100, that signal is inverted twice by inverters 118 and 120 before being input to a NAND gate 116. The other input of the NAND gate 116 is the clock signal E. The output of the NAND gate 116 is the read signal *R. The output of the inverter 118 is the read/write signal R/*W. Further, the clock signal E is inverted in an inverter 122 and used as an input to the address selection circuitry 112. In addition, the valid memory access VMA output of the microprocessor 100 is input to the address selection circuit 112. The signal VMA is a conventional 6802 signal which, when at a high logic level, indicates an address on address bus 108 is stable and can be read.

An interrupt generation circuit is comprised of a divide by 1190 counter 124, a D-type flipflop 126 and a D-type flipflop 128. The clock input CK of the counter 124 is connected to receive the clock signal E provided by the microprocessor 100 and divide this high speed clock by 1190. The output is a divided clock signal to the clock input CK of the flipflop 126. The Q output of the flipflop 126 is connected to the interrupt request input IRQ of the microprocessor 100 and the D input of the flipflop 126 is connected to ground. Therefore, on a positive going transition of the output of the counter 124 an interrupt is generated to the microprocessor 100. The time base of the clock signal E is a standard period based on the microprocessor oscillator which results in the generation of the interrupt every 1190 microseconds. This provides a convenient means to allow the program of the microprocessor 100 to keep a real time reference. This real time reference is used to call foreground routines of the microprocessor 100 which input the communications from the communication interface circuitry 132, the data from the tension arm positive circuitry 134, and the data from the reel tachometer conversion circuitry 138. The foreground routines are also used to output the digital words to the reel motor drive circuitry 136. These interrupts occur about 14 times per video field for a NTSC format television signal which has a frame rate of 30/sec and about 15 times per video field for a PAL format television signal which has a frame rate of 25/sec. After the foreground routines have been executed, the microprocessor 100 will transfer control back to a main program loop or background which executes a program for the cue mode which is one section of the loop. The interrupt flipflop 126 receives a signal at its set terminal from flipflop 128 which either permits the interrupt to occur, or prevents and removes the interrupt depending upon the logic level of the signal. Because the interrupt at the IRQ input will be present if a low logic level is applied, selecting flipflop 128 with the port select signal P3 when its D input is low will cause the flipflop 126 to be set and any interrupt to be cleared. Holding the 3 *S input of flipflop 126 low will prevent any further interrupts from occurring. The interrupt flipflop 126 is re-enabled by applying a high level to the D input of flipflop 128 and then selecting the device with port selection signal P3.

The communications between the reel control 14 and its peripheral devices both output and input, are controlled by a combination of the memory cycle signals *W, *R, R/*W, and the port selection signals from the address selection circuitry 112, and take place over an extension 32 of the data bus 110. The data bus 110 is extended through a bidirectional bus buffer 130, which connects with its B1-B8 terminals to the data bus 110 and with its bidirectional terminals A1-A8 to the peripheral RC data bus 32. The bus buffer 130 is enabled by the block select signal S4 from address selection circuitry 112 applied to its enable input EN. Further, the direction which data flows is determined by the logical level of the *W signal applied to the direction input DIR. Data from the peripheral RC data bus 32 is transferred to the microprocessor via the data bus 110 when the buffer 130 is enabled and there is a high level logic signal on the DIR input, thereby indicating a read function. Conversely, data is transferred from the microprocessor via the memory data bus through the buffer to the peripheral RC data bus 32 when the buffer 130 is enabled and a low level logic signal, or a write signal, is applied to the DIR input. In this manner, the nonmemory or peripheral devices may communicate conveniently with the microprocessor 100 through the bus buffer 130.

Referring to FIG. 4A, there are four peripheral circuits with respect to which the microprocessor 100 either supplies information to or receives information, including a communication interface circuitry 132, tension arm position circuitry 134, reel motor drive circuitry 136, and reel tachometer conversion circuitry 138. The communication interface circuitry 132 permits communication between the transport control 12 and the reel control 14 (FIG. 1). The transport control data bus 15 has data lines D0-D7 that provide data to, or receive data from, the peripheral RC data bus 32 through the communication interface circuitry 132. Control of data transfers between the peripheral RC data bus 32 of the reel control and the communication interface circuitry 132 is provided by port select signals P2, P4, P6 and P11. Control of data transfers between the communication interface circuitry 132 and the transport control data bus 15 is provided by transport control clock signal TCE and transport control peripheral select signal TC PER SEL provided on the lines of control bus 19, together with address signals provided over the address lines A8-A11 of the transport control address bus 17.

The tension arm position circuitry 134 allows the microprocessor 100 to read the position of the tension arm 42 (FIG. 1) provided by the analog input signal TA POS placed on line 52. Further, the tension arm position circuitry 134 compares the input tension arm position signal with a selectable reference and generates a digital data word indicative of tension arm position error that is provided to the microporcessor 100. The circuitry 134 additionally permits the microprocessor 100 to set the selectable reference to correspond to either one of the two reference positions 42' and 42'' (FIG. 1) for the tension arm 42 in dependence on the direction of transport of the tape. Port select lines P0 and P1 are input to the tension roller position circuitry 134 to accomplish the necessary data transfers through the buffer 130.

The reel motor drive circuitry 136 receives digital data words from the microprocessor 100 over the RC data bus 32 which are indicative of the analog motor drive signals required by the takeup reel (TU DELTA e) and for the supply reel (SU DELTA e). Communications from the RC data bus 32 to the reel motor drive circuitry 36 are controlled by signals on the port select lines P12 and P13. The reel motor drive circuitry converts the received digital words into the corresponding analog forms necessary to drive the reel motors.

The reel tachometer conversion circuitry receives the quadrature tachometer signals TU A, TU B over lines 56 from the tachometer linked to the takeup reel 18 and the quadrature tachometer signals SU A, SU B over lines 54 from the tachometer linked to the supply reel 16, and produces corresponding digital output words which are provided to the microprocessor 100 through the peripheral RC data bus 32. These digital words are representative of the reel speeds and the tape pack diameters. Further, the signal F/R, indicative of the direction of tape transport, is provided over line 14 to the reel tachometer conversion circuitry 138 and is converted thereby to digital words for use by the microprocessor 100. This signal, as previously described, is developed in the transport control 12 (FIG. 1) from the idler tach signal generated by the tape tachometer 48 and is supplied as a separate digital signal for transfer to the microprocessor 100. The processed tach signal PT is input to the reel tachometer conversion circuitry 138 over line 14 as a pulse train at four times the frequency of the idler tach signal. This signal is developed by the transport control 12 from the idler tach signal to provide a measure of the speed at which the tape is being transported and is transferred to the reel tachometer conversion circuitry 138 for use in the conversion of signals to a form required for processing by the microprocessor 100.

Data transfers between the reel tachometer conversion circuitry 138 to the microprocessor 100 are controlled by address signals on address lines A1 and A2, the timer select signals on lines TF, TG and the port selection signals on lines P14, P15. The data transfers are executed in response to the read signal *R and write signal *W provided to the reel tachometer conversion circuitry 138.

Figure 5:
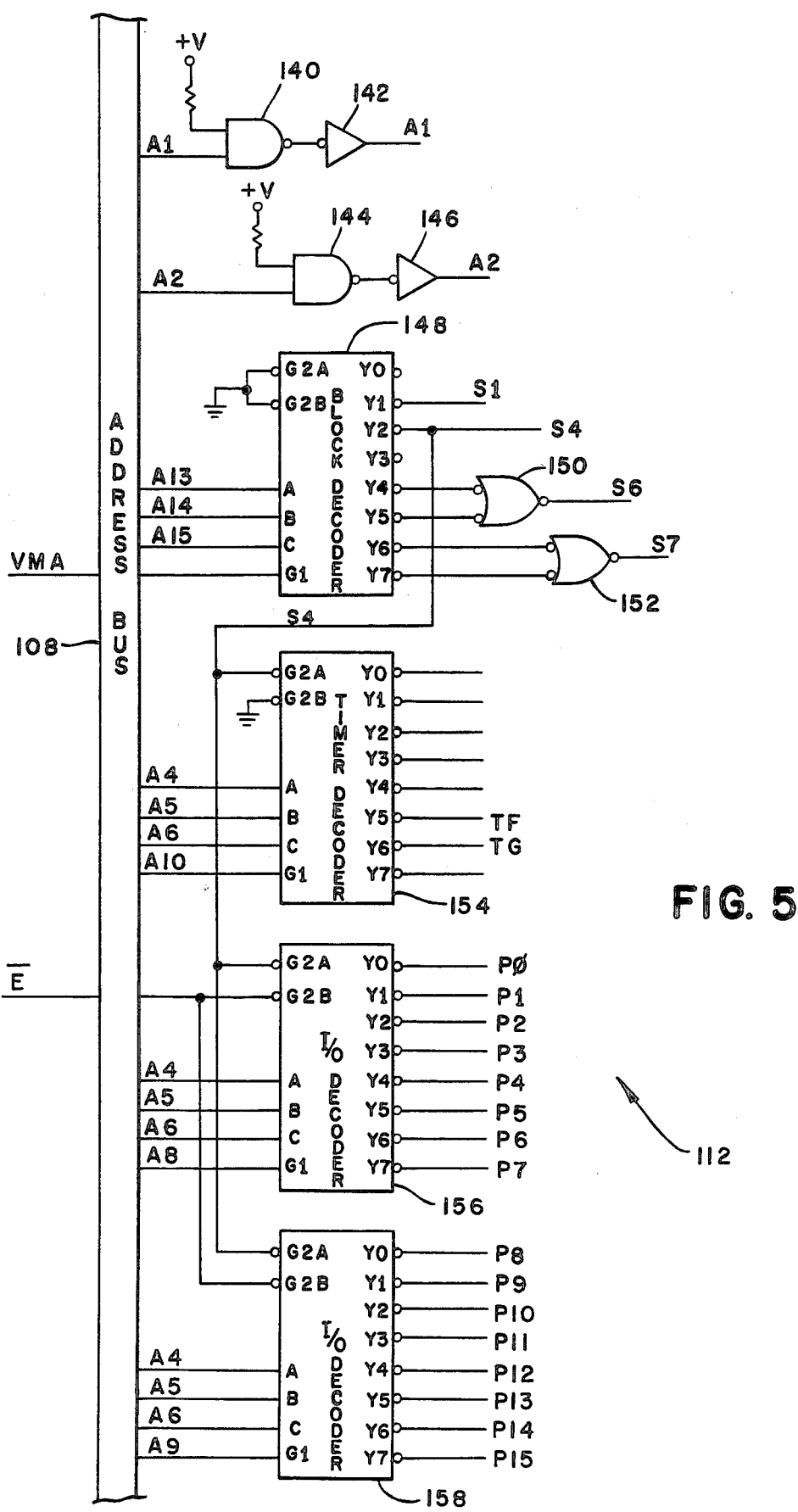
FIG. 5 is a detailed electrical schematic diagram of the circuitry comprising the address selection circuitry illustrated in FIG. 4.

FIG. 5 illustrates a detailed electrical schematic of the address selection circuitry 112 employed in the reel control 14 illustrated in FIGS. 4A, 4B. Address lines A1 and A2 from the address bus 108 are applied to NAND gates 140, 144, and the following inverters 142, 146, respectively, to become buffered select lines A1 and A2. The remaining portion of the address selection circuitry comprises four similar decoders 148, 154, 156 and 158. Each of the decoders has address decoding inputs A, B, and C, enabling inputs G1,*G2A,*G2B, and outputs *Y0-Y7. To enable the decoding function of each device, a low level logic signal is applied to the *G2A,*G2B inputs and a high logic level signal is applied to the G1 input. After enablement, the selected output *Y0-Y7 is determined by the 3-bit combination applied to the decoding inputs A, B, and C.

Decoder 143 acts as a block select generator and decodes address lines A13-A15 to produce the address block selection signals S1, S4, S6, and S7. The address block decoder 148 is enabled at its G1 input by the valid memory access signal VMA from the microprocessor 100. The VMA signal alone provides enablement of the decoder 148 because its *G2A,*G2B inputs are grounded. Each of the address block select signals are used to enable a different portion of the memory space of the microprocessor. For example, S1 selects the random access memory, S4 selects the peripheral input/out devices and S6 and S7 select the programmable read only memories 104 and 106, respectively.

The address block select signal S6 is a combination of the outputs Y4 and Y5 applied to a NOR gate 150 with negative true inputs and a negative true output. Similarly, the address block select signal S7 is a combination of the outputs Y6 and Y7 of the decoder 148 combined in NOR gate 152, having negative true inputs and a negative true output. This address block selection permits the paging of the PROMS to break them up into manageable address areas for access by the software.

It is seen that the address block select signal S4 enables the *G2A input of the timer decoder 154. The G1 input of that decoder is enabled by address line A10 and the decoder inputs A, B and C are connected to address lines A4–A6 of the address bus 32. The outputs Y6 and Y7 of decoder 154 generate the timer select signals TF and TG, respectively. Thus, the timer decoder 154 generates the timer select signals TF and TG during a valid memory access which causes the generation of the address block select signal S4, a high logic level on the address line A10, and the decoding of the respective code on address lines A4, A5, and A6 for the Y5 and Y6 outputs.

Decoders 156 and 158 are input/output decode selection devices generating the port selection signals P0–P15 from their outputs Y0–Y7, respectively. The decoders 156 and 158 are enabled by the address block select signal S4 and the clock signal E applied to their *G2A,*G2B inputs, respectively. The decoders 156, 158 decode the address lines A4–A6 to provide enablement of their respective outputs and are selected by address lines A8 for decoder 156 and address line A9 for decoder 158. In this manner, the microprocessor 100 can select among a number of peripheral devices with address block select signal S4 and the inversion of the clock signal *E. It is seen that the decoders 154, 156 and 158 are enabled by the different address lines A8, A9 and A10, respectively.

The decoders 148, 154, 156, and 158 provide selections signals for the microprocessor 100 which are used to produce input data and output data in a memory mapped machine. The block decoder 148 selects with signals S1, S4, S6, and S7 different memory segments which are read from or written to. The select signal S4 enables all three decoders 154, 156, and 148 which are used for non memory devices such that signal S4 is a peripheral device select signal. The peripherals selected or controlled by the output of the decoders 154, 156, and 158 are those previously discussed in blocks 132, 134, and 138 in FIG. 4B.

I/0 Decoders 156 and 158 provide enabling signals P0, P1 to the tension arm position circuitry 134; signals P2, P4, P6, and P11 to the communication interface circuitry 132; signals P12, P13 to the reel motor drive circuitry 136; and signals P14, P15 to the reel tachometer conversion circuitry 138. The timing signals TF, and TG of decoder 154 are also used by circuitry 138 to provide reference signals for transferring data at particular times.

Figure 6:
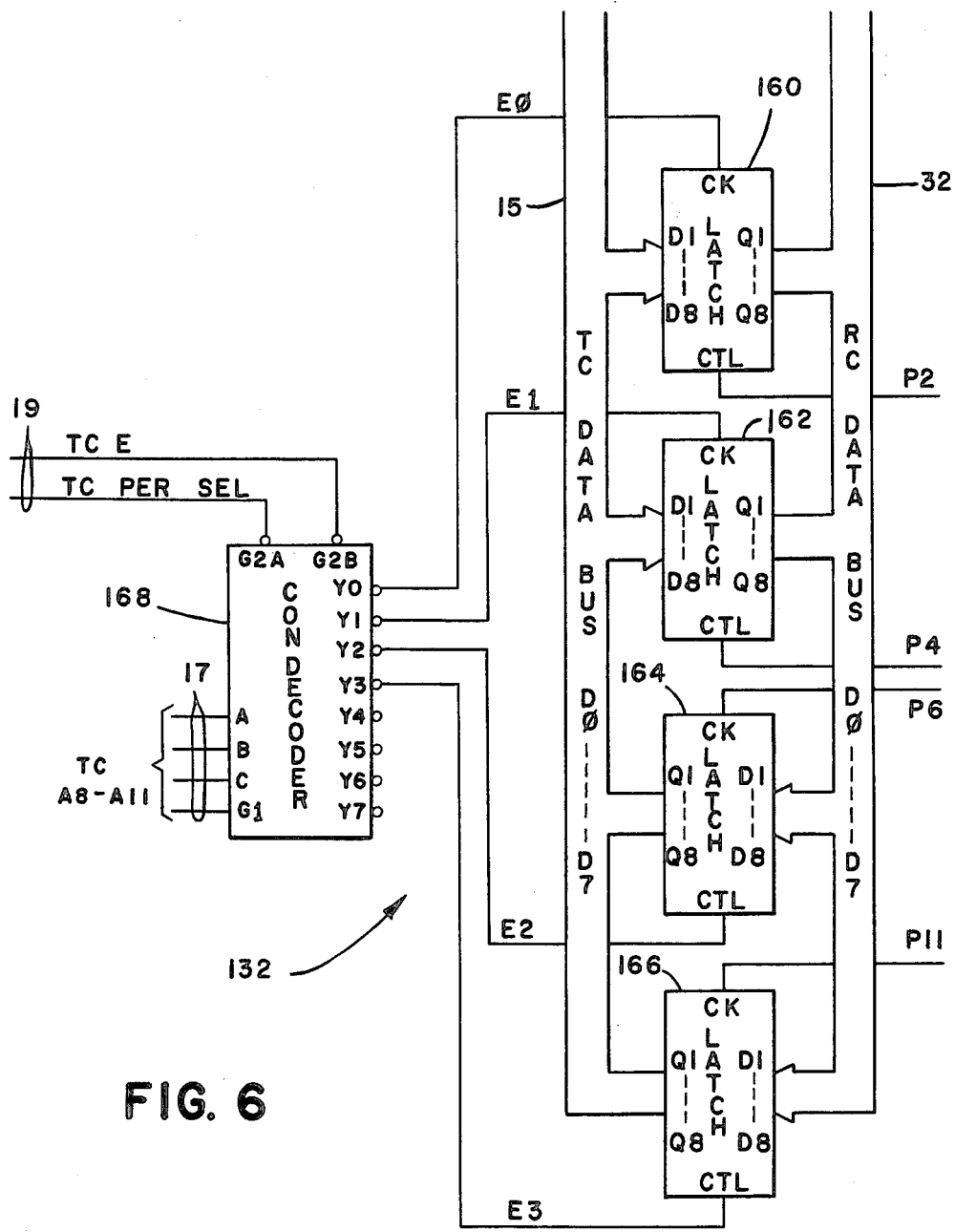
FIG. 6 is a detailed electrical schematic diagram of the circuitry comprising the communication interface circuitry illustrated in FIG. 4.

FIG. 6 is a detailed electrical schematic of the communication interface circuitry 132 employed in the reel control 14 illustrated in FIG. 4B. The communication interface circuitry 132 is used to transfer data and commands in the form of digital bytes between the two controls 12 and 14. The transport control 14 transmits mode, command, and distance to cue data over the interface. The reel control 12 responds with acknowledgements for the commands and status words which indicate the operations of the reel servos. The interface circuitry 132 comprises four data latches 160, 162, 164, and 166, and a control decoder 168, which decodes the address signals placed on the address lines of the transport control address bus 17 coupled to the decoding inputs A, B and C. The control decoder is enabled by a combination of signals on the transport control address line A11, the transport control peripheral select line TC PER SEL and the transport control clock line TC E applied to its *G2A, *G2B and G1 inputs, respectively. From these signals, the control decoder 168 generates the selection signals E0–E3 synchronously with the signal on the clock line TC E.

The latches 160 and 162 form input latches for the reel control 14 and latches 164 and 166 comprise output latches for the reel control. The input latches have their data inputs D1–D8 coupled commonly to the transport control data bus 15 and their outputs Q1–Q8 coupled commonly to the RC data bus 32. The transport control 12 transfers data to the latches 160, 162 by placing data onto the transport control data bus 15 and clocking the data into the latches with the select signals E0 and E1, respectively. The microprocessor 100 completes the transfer of the data to the RC data bus by applying the port select signals P2 and P4 which responsively output the data onto the reel control data bus 32. Each time the latches receive the select signals E0 and E1, the latches are updated with the new data from the TC data bus 15.

The transfer of data from the reel control 14 to the tranport control 14 is a reversal of the process just described and uses output data latches 164 and 166. The data latches 164 and 166 have their data inputs D1–D8 coupled commonly to the RC data bus 32 and their outputs Q1–Q8 coupled commonly to the transport control data bus 15. Data from the reel control 14 is latched into the devices 164 and 166 by the microprocessor 100 placing it on the reel control data bus 32 and then generating the port selection signals P6 and P11, respectively. Data is then read from the latches onto the transport control data bus 15 by clocking them with the selection signals E2 and E3 provided by the control decoder 168.

In this manner, two bytes of data, one at a time, are transferred between the two controls 12 and 14. For the cue operating mode being described, the communication interface circuitry 132 is used to provide a two-byte word representing the distance separating the selected storage location from the cue point in SMPTE time code units of video frames.

Figure 7:
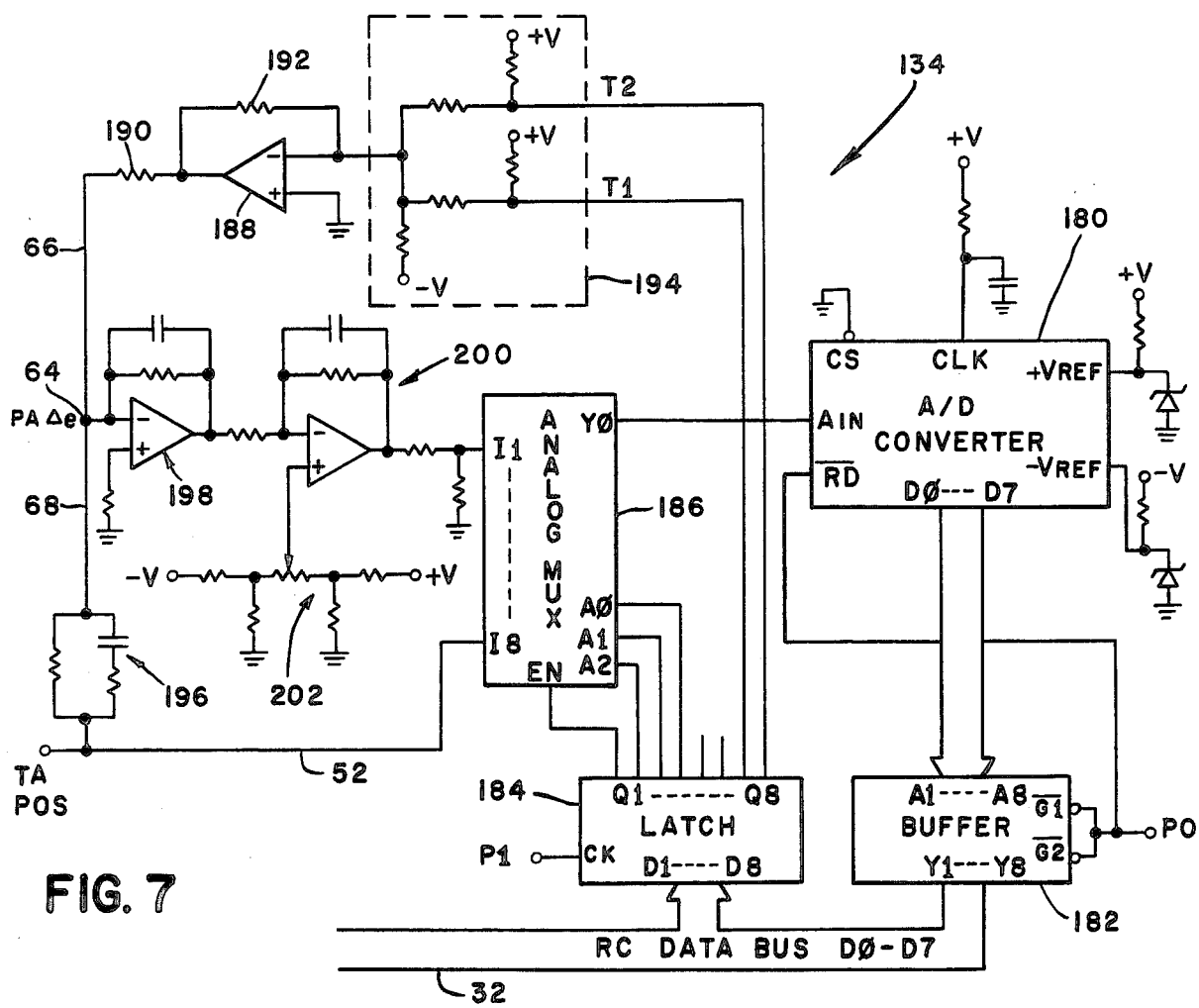
FIG. 7 is a detailed electrical schematic diagram of the circuitry comprising the tension arm position circuitry illustrated in FIG. 4.

The circuitry of the tension arm position circuit 134 of the reel control 14 illustrated in FIG. 4A will now be described with reference to FIG. 7. The RC data bus 32 is connected to the inputs D1–D8 of a synchronous latch 184 and to the outputs Y1–Y8 of a buffer 182. The latch 184 is used, in part, as a control latch to receive a data word from the microprocessor 100 via the RC data bus 32 which controls the coupling of the inputs and outputs of an analog multiplexer 186. The data word which is used for the control is clocked into the latch by the selection signal P1 applied to the CK input of the device 184.

The analog multiplexer 186 has eight analog input ports I1-I8 and three address inputs A0-A2, to which is applied a three bit address word used to select one of the eight inputs for coupling to the output Y0 of the multiplexer. The Q1 output of the latch 184 enables the analog multiplexer 186, while the latch outputs Q2-Q4 are coupled to the A0-A2 inputs to select the multiplexer input that is coupled to its output Y0, which thereby passes a selected input signal to Ain input of an analog to digital converter 180. For the purposes of the present invention, only two inputs I1 and I8 of the analog multiplexer 186 are used which, respectively, input the tension arm position TA POS present on line 52 and the tension arm error PA DELTA e. The tension arm error PA DELTA e is developed at the summing junction 64 connected to the inverting input of an operational amplifier 198. One input to the summing junction 64 is line 68 that carries the tension arm position signal TA POS after it passes through compensation and phase shifting circuitry 196. At the summing junction, the signal TA POS is differenced with a reference tension arm position signal, which is received over line 66 from the output of a buffer amplifier 188 having scaling resistors 190 and 192.

The buffer amplifier 188 scales a selectable reference voltage from reference voltage generation circuit 194. The reference voltage is indicative of a desired tension arm reference position and will be one of two values. The value of the reference will be selected based upon the direction of tape transport and correspond to the reference position 42' and 42" as illustrated in FIG. 1. The reference generation circuit 194 is a resistor-voltage source combination having two logic inputs T1 and T2. Depending upon the logic levels of the signals T1, T2, the output of the reference generation circuit is one of the two different reference levels which is buffered by the amplifier 188 before its application to the node. The signals T1 and T2 are the Q7 and Q8 outputs of the latch 184. The digital control word transferred from the microprocessor 100, therefore, sets the reference level corresponding to the tension arm position which is differenced with the actual tension arm position signal at 64. Any difference results in an error signal which is filtered by active filters 198 and 202 having high frequency rolloffs set by their respective resistor and capacitor components. An adjustable reference circuit 200 allows the ground reference for the input I1 of the analog multiplexer 186 to be set on the active filter 200. It is seen that the analog error PA DELTA e is the error for the supply reel servo of the block diagram illustrated in FIG. 3. This analog signal after being converted to a digital value and stored will be output to the digital to analog converter 26 as the drive signal for the supply reel servo.

The microprocessor 100, by transferring the correct control word to the latch 184 via the RC data bus 32, may apply either the error PA DELTA e at the I1 input of the analog multiplexer or the position signal TA POS at the input I8 to the A/D converter 180. Further, the tension reference is modified by the selection of signals T1 and T2 by microprocessor 100 through latch 184, which allow for different tension arm positions to be maintained during different directions of operation of the reel control 14 as mentioned previously. The selected analog signal is input to the A/D converter 180, converted to a digital value, and output to the buffer 182 in response to a command from microprocessor 100. The output command for the A/D converter 180 is the port selection signal P0 provided by the address selection circuit 112 (FIG. 5). The P0 selection signal also enables the outputs of the buffer 182 to apply the converted analog value, now in digital form, to the RC data bus 32. Actually it is the previous conversion value of the A/D converter 180 which is read from the buffer outputs while the device is performing the next conversion. The digital value is read into a memory location of the microprocessor 100 from the data bus 32 where it is handled by different background routines when needed. If the digital word is the position error PA DELTA e, then it is output immediately to the D/A converter 26 for the supply reel servo loop. The digital word relating to the actual position PA of the tension arm is used in a position limiting routine for another part of the servo.

Figure 8:
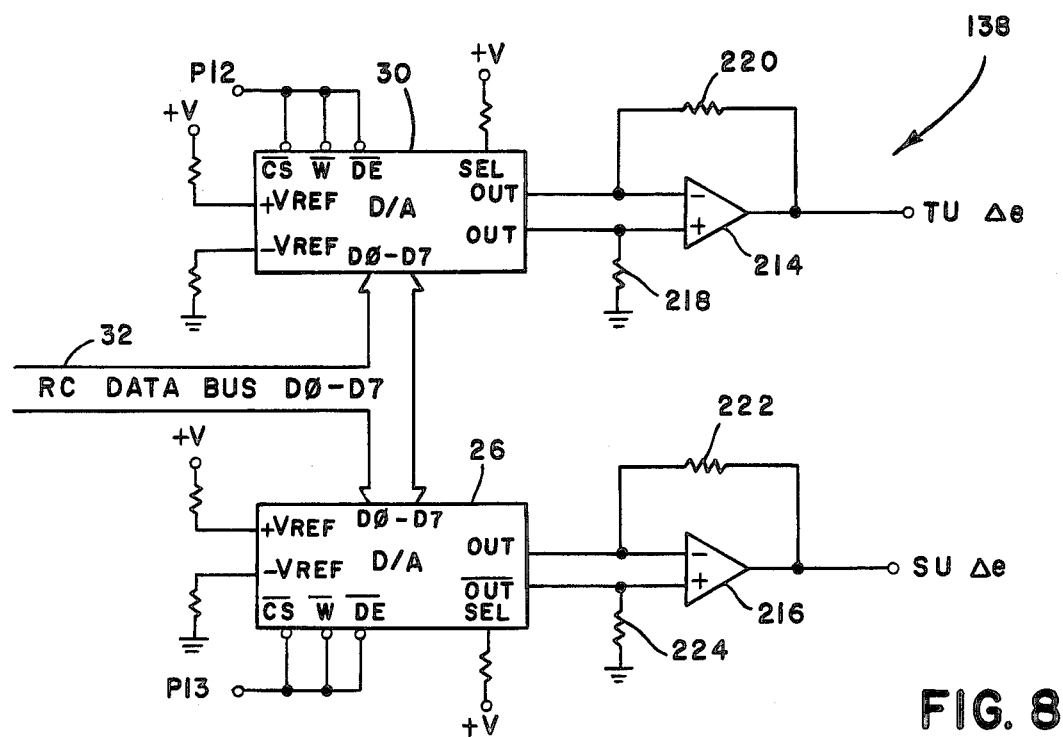
FIG. 8 is a detailed electrical schematic diagram of circuitry comprising the reel servo motor drive circuitry illustrated in FIG. 4.

The reel motor drive circuitry is shown in detail in FIG. 8. The RC data bus 32 extends to the inputs D0-D7 of a pair of digital to analog converters 26 and 30, respectively. The D/A converters 26 and 30 as previously described, receive digital error signals from the reel control and convert those signals into an analog form with which to dirve the motors of the reel. The D/A converter 26 is enabled by the port select signal P13, which is applied to its chip select input *CS, its write input *W; and its data enable input *DE. The D/A converter 26, converts the digital value received over the RC data bus 32 to an output current value which is an analog representation of that digital value. Operational amplifier 216, having has its inverting input connected to the output OUT and its noninverting input connected to the output *OUT of the converter 26, is configured as a current to voltage converter. The current to voltage converter 216, thereafter, converts the analog current to a voltage representative of the supply reel velocity error SU DELTA e. This velocity error is then used to control the supply reel motor 20 in the manner previously described.

D/A converter 30 is similarly connected as the D/A convertor 26 by having a current to voltage convertor 214 connected to its outputs and the port select signal P12 connected to its chip select input *CS, its write input *W and its data enable input *DE. When the port select signal P12 is applied and data is placed on the RC data bus 32, the D/A converter 30 generates a current representative of that digital value. The current to voltage convertor 214, thereafter, converts the analog current to a voltage representative of the takeup reel velocity error TU DELTA e. This analog form of the velocity error is then used to control the takeup reel motor 22 in the manner previously described.

The current to voltage conversion is accomplished by the operational amplifiers 214, 216 having their noninverting inputs connected to ground through resistor 224, 218, respectively, and their outputs connected to their inverting inputs via resistors 222, 220, respectively. These operational amplifiers are then configured as inverting differential current amplifiers.

Figure 9A:
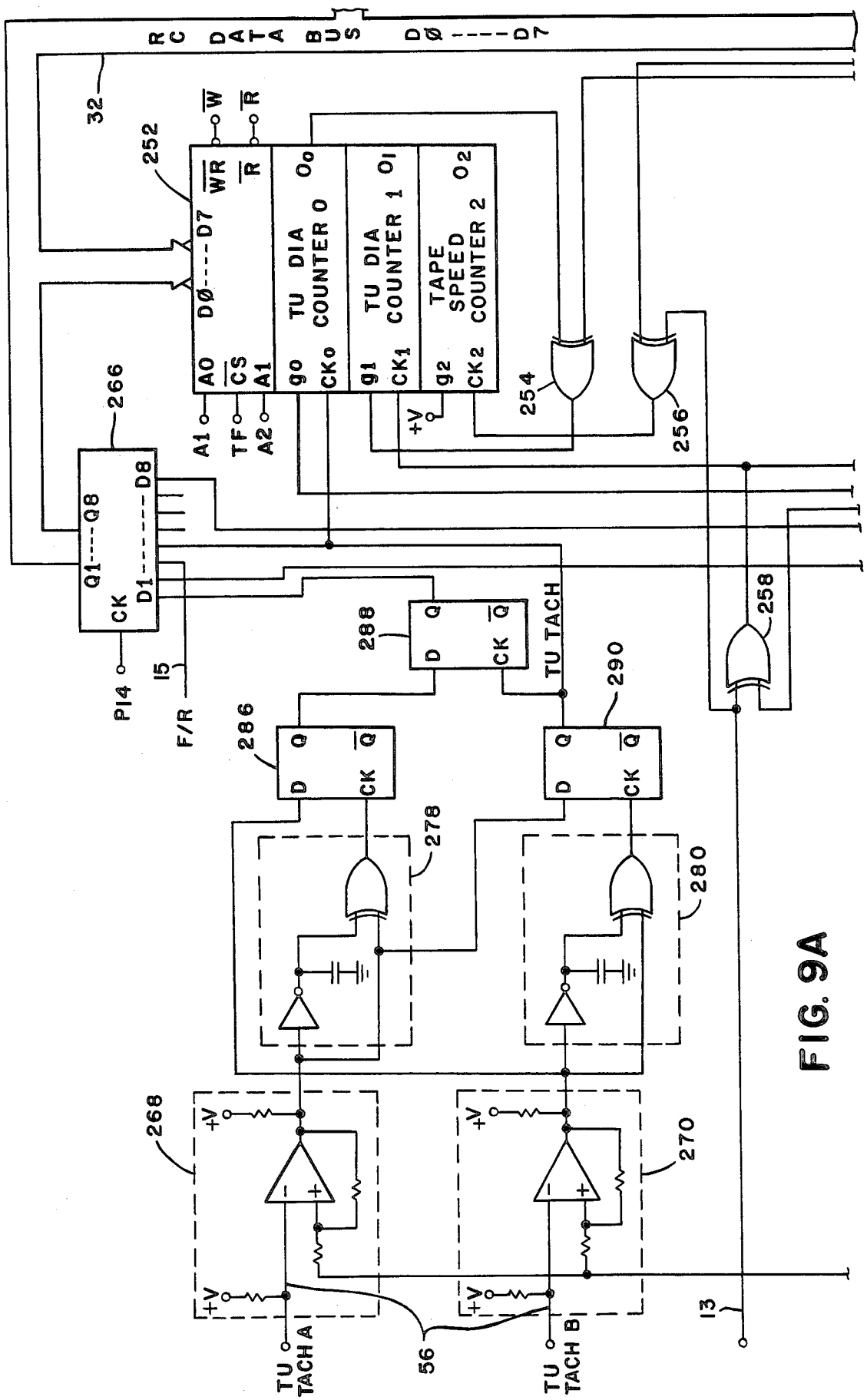
FIGS. 9A and 9B together comprise a detailed electrical schematic diagram of circuitry comprising the reel tachometer conversion circuitry illustrated in FIG. 4.
Figure 9B:
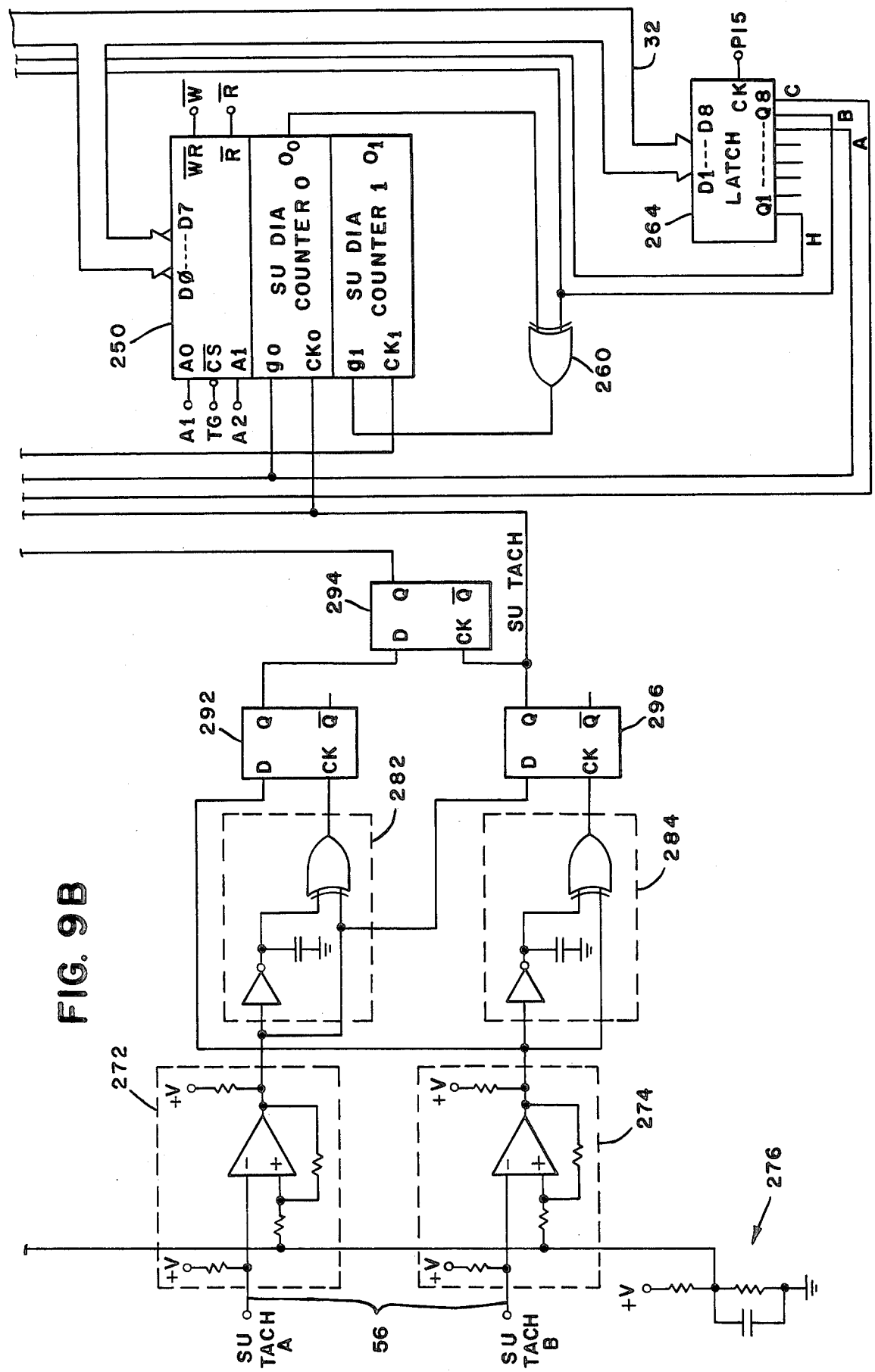

With reference now to FIGS. 9A and 9B, there is shown the reel tachometer conversion circuitry 138 which receives the two sinusoidal quadrature signal pairs TU TACH A,B and SU TACH A,B to produce digital signals for the microprocessor 100 that allow the determination of the tape pack diameter on the takeup and supply reels 18 and 16, and the direction and speed of the takeup and supply reels. Further, the tape speed and direction indicative signals, PT and F/R are input to the microprocessor 100 of the reel control 14 through this circuitry. The circuit comprises two counter circuits 250 and 252 which are assigned to the supply reel tachometer and to the takeup reel tachometer, respectively. These circuits perform the basic preprocessing of the tachometer signals from the supply reel, takeup reel, and processed tach signal.

The takeup reel counter circuit 252 illustrated in FIG. 9A comprises three individual counters 0, 1, and 2 each having enabling inputs g0, g1, and g2; clock inputs CKO, CKI, and CK2; and outputs 00, 01 and 02 respectively. The contents of each counter in the circuit 250 may be either preset or read from the counter via bidirectional inputs D0-D7 of a buffer which are coupled to the RC data bus 32. The selection of whether to preset a counter or to read the contents of the counter are provided by the inputs *W; and *R which are connected to the signal lines *W and *R of the memory cycle decoding circuitry of the microprocessor 100. The selection of which counter in the circuit to read or preset is made by the address inputs A0 and A1 which are connected to correspondingly referenced address lines from the address selection circuitry 112 (FIG. 4A) of the reel control 14. The counter circuit 252 is enabled by the timer selection line TF being applied to its chip select input *CS.

The supply reel counter circuit 250 illustrated in FIG. 9B has similar inputs and outputs and selection of one of the two counters for that circuit is made by address lines A1 and A2 in a manner described for the takeup reel counter circuit 252. The counter circuit 250 is enabled by the timer selection signal TG applied to its chip select input *CS. In the preferred embodiment of the circuitry the supply reel counter circuit 250 and the takeup reel counter circuit 252 comprise single integrated circuit chips having their counters integrated thereon.

The circuitry which feeds the counter chips 250, 252 includes four identical circuits, two for each of the sinusoidal quadrature tach input signal pairs. These circuits process the analog tach signals into digital values. Each of the four identical circuits comprise a comparator and pulse generator pair, such as 268 and 278, 270 and 280, 272 and 282, 274 and 284. Comparators 268, 270, 272 and 274 receive the four respectively referenced tach signals at their inverting inputs and compare that signal with a threshold at their noninverting inputs which is developed by a resistor-capacitor network 276. The outputs of the comparators are square waves which are applied to the following pulse generator circuits 278, 280, 282 and 284. The pulse generator circuits, each of which is comprised of an EXCLUSIVE OR gate, an inverter, and a capacitor, operate to provide an pulse at the output of the EXCLUSIVE OR gate for each edge transition that is produced by the corresponding comparator.

The output pulse from the EXCLUSIVE OR gate of circuit 278 clocks a D-latch 286 which has its Q output extending to the D input of another D-latch 288. The D input to the D-latch 286 is from the output of the comparator 270 and this level will either be a "one" or a "zero" depending whether the TU TACH A signal leads or lags the TU TACH B signal by 90°, i.e., it depends upon which direction the takeup reel is rotating. From the clock pulses and this level the D-latch 286 outputs a square wave signal which is the square wave developed at the output of comparator 270 but delayed by 90°. D-latch 290 is used to generate a similar signal from the square wave output of comparator 268 in combination with clock pulses from circuit 280. The two square wave outputs of the D-latchs 286, 290 are applied to another D-latch 288 where the Q output of D-latch 286 is used as the D input and the Q output of D-latch 290 is used as the clock input. Because the two signals have maintained their phase relationship, merely being delayed in the shaping process described, the Q output of the D-latch 288 provides an indication of which direction that the takeup reel is rotating by generating a "one" logic level if the square wave of D-latch 286 leads the square wave of D-latch 290 and a "zero" logic level if it lags. The output of the D-latch 290 is also used as an indication of takeup reel speed as the frequency of the square wave is proportional to reel rotation velocity. It is evident that this is a convention used for this machine and the signal from the output of D-latch 286 could be used.

In a similar manner, the output of the pulse generating circuit 282 clocks a D-latch 292 whose D input is the output of comparator 274 and the output of pulse generating circuit 284 clocks a D-latch 296 whose input is the output of comparator 272. The Q output of D-latch 292 is applied to the D input of D-latch 294 and that device is clocked by the output of D-latch 296. Therefore, the output of the D-latch 294 is an indication of the direction of rotation for the supply reel. This direction indication is transferred by the Q output of device 294 to one of the inputs of latch 266. The outputs from the D-latches 290 and 296 are thus square wave signals which have a frequency corresponding to the speed of the takeup reel and supply reel, respectively. The outputs of D-latches 288, 290 produce logic levels indicative of the direction of rotation of the takeup reel and supply reel, respectively.

Further, the outputs from the D-latches 290 and 296, which are the TU tach and SU tach signals, are used to clock the counter 0 of the chips 252 and 250, respectively. Each counter 0 for the chips 250 and 252 are enabled by the Q6 output bit from a latch 264 labeled signal A. The takeup diameter counter and the supply diameter counter count the tach pulses when enabled by the A signal. When these two counters overflow, their outputs 00 are fed back to the enable input g1 of counter 1 of each chip. The feedback signals pass through EXCLUSIVE OR gates 254 and 260 which are enabled by the same Q7 output bit of latch 264 which is referenced as a signal B. Thus, when the counter 0, for example, of chip 250 is at an overflow condition, a disabling signal is applied to counter 1, which then stops counting the signal PT signal which is input to the CK1 input of counter 1. Similarly, the counter chip 252 has its counter 1 input g1 disabled by the overflow of counter 0 and counts the PT signal applied to its CK1 input. The EXLUSIVE OR gate 258 passes the PT signal upon being enabled by the Q8 output bit of the latch 264 which is labled signal C. Counter 2 of the chip 252 is used as the tape speed counter and receives clocking pulses at input CK2 from the PT signal through EXCLUSIVE OR gate 256. The OR gate 256 is disabled by the Q1 output bit of latch 264 referenced as signal line H.

The microprocessor 100, therefore, may interrogate the circuitry illustrated in FIGS. 9A and 9B via the data bus 32 and control lines *W, *R, A0, and A1, to determine the direction of rotation of the takeup and supply reels and read the SU and TU tachometer pulses directly by clocking latch 266 with the port select signal P14. This action will place the data presented at the D1-D8 inputs of the latch 262 onto the data bus 32 where it can be input to the microprocessor 100. This data latch input also provides a method for inputting the signal F/R from the transport control 12 which is an indication of tape transport in the forward or reverse direction.

Further, the microprocessor 100 can determine the tape pack diameter on the takeup reel by interrogating the count stored in counter 1 and counter 2 for chip 252 and the supply reel tape pack diameter by interrogating counter 1 for chip 250 and counter 2 for chip 252. The microprocessor 100 also can determine the velocity of the tape by interrogating counter 2 of chip 252. The diameters of the tape pack on the takeup reel and supply reel can then be calculated in a straight forward manner from these stored counts by a software routine which determines each diameter. From the values of the supply reel diameter and takeup reel diameter one can obtain the size of the reel by adding the two values or the tape pack distribution by taking a ratio of the two values.

The tape diameter calculation of the reels recognizes that the count stored in counter 1 of each chip 250, 252 is the number of PT signal pulses per an angular distance of rotation of the respective reel. This count is developed by counting the PT signal pulses between overflows of the counter 0 devices of the chips. The time between the overflows of the counter 0 devices is directly proportional to an angular distance of rotation of a reel and is the number of PT tachometer pulses per revolution divided into the number of counts per overflow. The output of counter 2 of the chip 252 is used to calculate tape speed or velocity. By knowing the velocity of the tape and the time for an angular distance of one reel rotation, the circumference of a tape pack is calculated by taking the product of the two parameters. The diameter of the tape pack is related to the circumference through the constant 3.14 or pi.

In FIG. 10 there is shown a graphical illustration of a family of velocity change profiles by which the transport of a record medium is controlled in accordance with the present invention. The illustrated example will use deceleration velocity change profiles to provide an adaptive cue mode of operation for a video tape transport but it should be realized that the invention is adaptable to many systems for the transport of recording mediums and could additionally use acceleration velocity change profiles. As one illustration of the use of the invention a specific tape transport mechanism, such as that shown in FIG. 1, uses the deceleration profiles as adapted by a pluralities of ballistics parameters to position a selected location of a video tape with respect to a reference point or the record/reproduce head.

The illustration shows commanded velocity or speed values in inches per second for the reel control servo of the takeup reel (FIG. 3) which are used during cueing. In the preferred embodiment, the speed values are generated as an 8-bit digital number which divides the commanded velocity range into 256 reference values. The digital numbers extend from 00 to FF hexidecimal to provide a commanded velocity value to which the takeup reel servo attempts to control the speed of transport of the tape. The maximum velocity that the tape transport is capable of providing is assigned the value FF and a stationery or zero velocity which the tape transport must provide at the cue point is assigned the value 00.

The curves 300-310 are optimum velocity change profiles for decelerating the tape during cueing. The profiles of the individual curves are the optimum speed values, as a function of the distance or video frames separating the selected storage location from the cue point which will crisply stop the tape with the selected frame parked at the cue point without overshooting the mark. In the video tape context a selected location is a track on the tape storing two fields, i.e., one frame of video information. The velocity change profiles have an implicit reference to recording speed as the number of video frames in an actual distance is directly dependent thereon. For different recording speeds the profiles may be changed so that the distance velocity relationships of the profiles are unaltered. The profiles are calculated based on determining the mechanics of motion of the tape and a parabolic trajectory which will decelerate the transport from a maximum velocity to zero velocity in the optimum time available.

Advantageously, the tape transport moves the tape at a maximum velocity along curve 300 until a selected frame location it is within a predetermined distance of the cue point. At the predetermined point, for example, 4096 frames away from the cue point referenced as point 312 in the drawing, the transport begins decelerating the tape from the maximum velocity toward a zero velocity along one of the profiles. The deceleration profile should bring the tape from a maximum velocity to a zero velocity in the shortest amount of time, without the selected frame location overshooting the reference point. As was mentioned previously, this optimum deceleration profile or square law of curve is developed from the ballistics parameters of a particular transport.

An optimum curve 302 is shown in FIG. 10A where, as the tape transport moves the selected frame location on the tape closer to the cue point, deceleration velocity values from the maximum velocity FF to the stationary position at velocity 00 are provided. Point 312, where the velocity of transport of the tape breaks from the maximum velocity line 300, is the intersection of the curve 302 and the maximum velocity line 300. However, curve 302 is representative of the optimum deceleration profile only when the ballistics parameters of the particular tape transport are known and all other variables are constant. In general, the curve 302 represents the optimum deceleration profile for a tape transport having a predetermined maximum inertial load or mass which the transport mechanism must move. A maximum inertial load on the transport apparatus is produced when the tape transport mechanism carries the largest or maximum reel size of tape.

If the ballistics of the transport of tape are changed, for example, by using a lighter inertial load which represents a smaller tape reel size, a different deceleration velocity chasnge profile 310 optimized for that load is selected for determining the velocity commands provided to the takeup reel servo. The deceleration curve 310 allows the tape to be moved at the maximum velocity FF for a longer time before decelerating and according to a more rapid deceleration velocity change profile. This profile is the fastest deceleration velocity change profile, and is selected for the smallest tape reel to be used on the transport mechanism 11, which provides the minimum inertial load on the transport mechanism 11. Between these maximum and minimum deceleration profiles 302 and 310, any number of n optimum deceleration profiles can be provided for different inertial loads representing different tape reel sizes. In an advantageous implementation the separate profiles can be chosen for the most probable ballistics parameters such as the standard reel sizes for a video tape recorder implementation. Three such different tape reel size deceleration profiles 304, 306 and 308 are shown to illustrate the preferred embodiment of the invention.

The profiles or square law curves are developed from the equation $V = \rho 2ax$ where a is a constant deceleration which brings the velocity V of the tape to zero within a distance X, where X is the distance to the selected location from the present location. It is evident the equation $V = 2ax$ is a simplified version of the general relationship for a moving body relating position, velocity, acceleration and time. The constant deceleration is the maximum deceleration that can be used from a particular distance away from a selected location for a fixed group of ballistics parameters which will not cause undershoot or overshoot of the intended location. When the ballistics parameters of a particular transport mechanism varies, the primary one being a mass change because of tape reel size in the video tape transport, a different deceleration constant a related to that change can be used. For example, the lighter the inertial loading on the tape transport mechanism 11, the longer the mechanism can wait to decelerate to a particular cue point and the larger the deceleration constant a can be for a particular profile.

The invention, in a general sense, contemplates using the velocity values from an optimum deceleration profile as chosen by a particular measured ballistics parameter of the tape transport to control the actual velocity of tape transport. Preferably, this is achieved by utilizing the difference between the maximum tape reel size deceleration velocity change profile 302 and the minimum tape reel size deceleration velocity change profile 310 and proportionally providing a velocity value therebetween for control of tape deceleration based on the measured tape reel size. A fraction of the difference between the maximum velocity and the minimum velocity at any distance to the cue point is then calculated by determining the fraction or percentage that the actual tape reel size is of the maximum tape reel size.

For example, if the transport has been placed in a cue mode for moving a selected location on the tape with respect to the recording/reproducing means, then at any distance X frames from the cue point 301, the minimum velocity point at 314 can be determined from curve 302. Likewise, for a distance X frames away from the cue point, the maximum velocity value 316 can be calculated from curve 310. Depending upon the actual reel size of the tape which is being transported by the transport mechanism, the invention contemplates using a portion or fraction of this difference between the maximum velocity and the minimum velocity. This fraction is then added to the minimum velocity to yield a commanded velocity value which is the output to the takeup reel servo to control actual tape velocity. This method of operation adaptively generates the commanded velocity according to the ballistics of the particular tape movement of a transport and the inertial load as actually measured by the tape reel size.

If the minimum deceleration profile 302 represents a tape reel having a size which will record two hours of video information, and curve 310 represents a deceleration profile for a reel size which is referred to as a spot reel (a 10 min–20 min reel), then a reel having a tape pack which will record a one-hour session will be 0.5 of the maximum tape size which will be seen by the transport. The adaptive cue profile control, when the tape transport is X frames away from the cue point, will difference the maximum velocity 316 and the minimum velocity 314 to determine a delta velocity value which is then multiplied by the inertial loading factor 0.5. The minimum value of velocity at 314 then has 0.5 DELTA added to it to yield the commanded velocity value. In this manner, a tape reel size can be used to select an adaptive deceleration profile based on tape reel size or inertial loading. It is understood that the delta value will vary depending upon the distance the transport is away from the cue point, but the fraction that the actual reel size is of the maximum reel size is constant once the reel has been chosen.

The method is implemented by the transport mechanism 11 and transport control 10 illustrated in FIG. 1. The system performs the method by reading the time codes off the tape with the head 45 and by inputting the time code of the selected address to determine the distance, in units of video frames, to the cue point 301. This distance is input to the reel control 12 which further determines the reel size by interrogating the reel diameter counters and tape speed counter of FIGS. 9A and 9B. Once the distance to the cue point and reel size have been calculated, a software routine stored in the PROMs of FIGS. 4A and 4B is used to select one of the profiles based on reel size from a cue profile generator. From the chosen deceleration profile and the distance to cue point, the profile generator will output a commanded velocity value which is input as the reference speed to the servo illustrated in FIG. 3. The reference speed is compared to the actual speed as measured by the tape speed counter illustrated in FIG. 9A and the error signal developed output to D/A converter 30. The motor 22 responds to the error signal to transport the tape in the manner commanded.

Other variable ballistics parameters, such as the direction of tape transport and tape pack distribution, are also measurable for the transport mechanism shown. The tape pack distribution is measured by the microprocessor 100 taking the ratio of the takeup and supply reel diameters obtained from reading the reel diameter counters in FIGS. 9A and 9B. The direction of the tape transport is produced by the transport control from the idler tachometer pulses as the logic signal F/R. The direction of tape transport can be determined by the microprocessor 100 by inputting this signal over data bus 32 through the circuitry shown in FIG. 9A.

One embodiment of a cue profile generator using an adaptive deceleration profile is illustrated in FIG. 11. The minimum deceleration profile, for example, curve 302 from FIG. 10 is stored in a first memory 328. The values of velocity are stored at particular locations of the memory and can be accessed by addressing them with a corresponding digital number representing the distance or number of frames from the present location to the cue point in time code. Further, the maximum deceleration profile such as that shown in curve 310 may be stored in a second memory 330 in the same manner. The values of velocity of the maximum deceleration profile can be similarly accessed by addressing the memory with the corresponding digital number representing the distance or number of frames to the cue point.

The two velocity values, determined from the minimum deceleration profile and the maximum deceleration profile, are then input on lines 337, 331 to a subtractor 332 and differenced with the result on line 333 input to a multiplier 334. The difference or value is multiplied in the multiplier 334 by a percent tape reel size input through line 335. The percent tape reel size is the proportion of the maximum tape reel size that the actual tape reel size is. The percent tape reel size is calculated from the tape diameter information input in FIGS. 9A and 9B.

The output of the multiplier 334 is a velocity value on line 341 which is input to an adder 336. The output of the minimum deceleration profile memory means 328 is also input over line 337 to the adder 336. The commanded velocity output on line 339 is the sum of the minimum deceleration profile velocity value and the velocity value resulting from the proportioning process. The calculations described above can take place periodically or every time the number of frames to the cue point varies to generate a new commanded velocity value. This operation will cause the velocity change or deceleration of the tape to follow one of the optimum profiles until the tape is parked at the cue location.

It should be evident that the second memory means 330 could, instead of storing the maximum deceleration profile, store the difference of the velocities or a DELTA value as a function of the distance separating the selected location from the cue point. This step would eliminate the necessity for taking a difference as described above and produce the same resulting commanded velocity value. In this instance, line 331 would connect directly into the input line 333 of the multiplier 334 and line 337 connect only to the adder 336.

Further, it should be understood that the block diagram shown in FIG. 11 can be implemented either in hardware or software. Instead of memories 328 and 330, it is evident that these elements could be replaced with function generators which output velocity values when interrogated with distance values. The function generators would select a profile from the proportioning process thereby choosing a constant deceleration and then calculate the velocity from the equation $V=\sqrt{2ax}$. Even more particularly, with reference to the reel servo control previously described, the minimum deceleration profile memory 328 and the maximum deceleration profile memory 330 can be implemented either as separate memories or as part of an addressable table in the programmable read only memory illustrated in FIG. 4B. In such embodiment, the calculations performed by the subtractor 332, multiplier 334, and adder 336 are implemented as a software program called as a subroutine during cue mode of operation.

FIG. 10 will now be referenced once more to describe an incremental method of performing proportioning and advantageously providing an adaptive deceleration profile. It is seen in the figure that between the minimum deceleration profile 302 and the maximum deceleration profile 310 a family of deceleration profiles, including curves 304, 306 and 308 can be developed. These curves represent various optimum deceleration profiles for actual reel size increments used on the transport and divide the distance between the maximum and minimum deceleration profiles into a selected number of equal increments m. For example, if the curve 310 represents an optimum deceleration profile for a spot reel and the curve 302 represents the optimum deceleration profile for a tape reel size of 2 hours, then incremental reel sizes between the maximum and minimum sizes can be represented in an incremental relationship. Therefore, a one-hour reel would be represented by curve 306 and a 30-minute reel represented by curve 308, and a 90-minute reel size represented by curve 304.

These curves are then assigned integer numbers from $n=0$ to $n=4$, such that a tape reel size can be described as one of the integers. The maximum deceleration profile 310 is assigned $n=4$ and the minimum deceleration profile 302 is assigned $n=0$. Curves 302, 304, and 306 are assigned integers 1, 2, and 3, respectively. If an actual tape reel size falls between two integers, then the lower integer value will be used as that will describe a slower deceleration profile. Since each curve describes an optimum deceleration profile, if the higher integer value was used for a tape falling between two values, then the tape transport would overshoot the cue point and another cycle would have to be performed to reverse and bring the tape back to the cue point.

The delta velocity values for every distance to the cue point are then divided by the number of increments m to produce an incremental DELTA/m value which can be used to provide an adaptive deceleration profile in the following manner. When the tape transport is in the deceleration region defined by the profile curves 302–310, the distance the selected location is away from the cue point is used to access a corresponding DELTA/m value. Once the minimum velocity increment DELTA/m has been determined, then the assigned integer n representing the actual tape pack is multiplied by this increment to determine the number of velocity change increments to be added to the reference velocity value based on inertial loading.

This method will now be explained with reference to a calculation of a commanded velocity value when the selected frame on tape is X frames from the cue point. When the selected frame is X frames from the cue point, the differential velocity value is equal to the difference between the velocity values at 316 and 314 for curves 310 and 302. The incremental value of this distance is DELTA/m where in our example $m=4$. Thus, $\frac{1}{4}$ of the differential velocity value is used as the incremental velocity value. This incremental velocity value times the reel number integer n assigned for the actual reel size is then added to the reference value found at 314 to generate the commanded velocity value.

For example, for a two-hour reel, the reference velocity values of curve 302 are used because the reel number integer, n, is zero, and therefore, no increment of the differential velocity is added. For a 90-minute reel size, $n=1$ and one minimum velocity increment, or 0.25 of the difference between the velocity values given by the $n=4$ and $n=0$ profiles for the spot and largest reel sizes at X frames distance to the cue point, is added to the reference velocity. Similarly, for a one-hour reel size, $n=2$ and two minimum velocity increments or 0.5 of the difference, is added to the minimum velocity value. For a 30-minute reel size $n=3$ and three minimum velocity increments or 0.75 of the difference, is added to the reference velocity value. Finally, for a spot reel size or $n=4$, the entire difference or four minimum velocity increments, are added to the minimum velocity value.

FIG. 12 illustrates an implementation of this incremental method by two memories 320 and 322. The first memory 320 stores the reference profile or the minimum deceleration profile corresponding to the curve 302 as a plurality of velocity values. The velocity value for any distance that a selected frame location is away from the cue point is then accessed by addressing the memory 320 with the number of frames to the cue point via input line 319. Similarly, the memory 322 stores corresponding incremental velocity values or DELTA/m as a function of the distance to the cue point in units of differential velocity divided by the number of increments m. These velocity increment values are accessed by addressing the second memory 322 with the distance or number of frames to the cue point with the input line 319.

The output of the second memory 322 is input via a connecting line 323 to a multiplier 326. The other input to the multiplier on line 325 is the reel size integer number n, which ranges from zero to m, depending upon the reel size and which is representative of the actual reel size, and thus, the actual inertial load on transport. In the multiplier 326, the DELTA/m incremental velocity value is multiplied by the integer n to produce an incremental velocity value on line 327. The value on line 327 is input to an adder 324, whose other input is the reference velocity value from the first memory 320. These two values are added in the adder 324 to become the commanded velocity value. The commanded velocity value is used at the reference speed command for the takeup reel servo in FIG. 3 to control the actual velocity of the tape movement.

As was the case for the embodiment in FIG. 11, the blocks of the block diagram in FIG. 12 can be implemented either by analog, digital, or discrete circuitry, or a software program. Preferably, such an implementation would have the memories 320 and 322 forming separate memories or portions of the programmable read only memories 104 or 106 illustrated in FIG. 4B. In such an embodiment, the calculations illustrated for adder 324 and multiplier 316 are executed by the microprocessor 100 in response to a subroutine of the cue mode program.

With respect to FIG. 13, there is shown a modification for the block diagram of the implementation illustrated in FIG. 12. Because multiplication is in its purest sense iterative addition, the multiplier 326 may be replaced by an iterative adder as seen in FIG. 13. In this embodiment, the signal line 343 is used to input the DELTA/m velocity increment value which is added to the output of an adder 344 through a switch 346. The switch 346 is closed n times, i.e., 0 to m times depending upon the reel size of the tape being transported by the transport mechanism. This type of iteration, or integration process, produces on an output line 347 which is the DELTA/m minimum velocity increment value multiplied by the assigned reel integer n. It is noted that an iterative process such as that shown is more advantageously adapted to a software loop for a small microprocessor which can do simple additions and subtractions very rapidly, but uses substantial program time to perform generalized multiplication subroutines.

While the example given illustrates an adaptive cue profile velocity change generator where m=4, there is no reason why a higher number of increments of the velocity difference cannot take place. The number m can be any integer value, such that velocity values for different size reels can be accurately and adaptively programmed. The example m=4 is selected because the most commonly used tape reel sizes in magnetic video tape transports are spot reels usually having 10 to 20 minutes of tape, and the larger 30-minute, 60-minute, 90-minute and 120 minute reel sizes.

Therefore, it has been shown that for a given number of velocity change profile and a distance to cue DELTA/m corresponds to the minimum velocity change increment possible. Velocity command changes for different reel sizes are obtained by multiplying (or iteratively adding) Delta/m by the reel size integer n. It should be evident that in addition to those embodiments just described, all (DELTA/m) n+REF values can be stored in a table which is equivalent to storing the values for all profiles.

In FIG. 14 there is shown another embodiment of the invention which adaptively selects a velocity change profile and a commanded velocity as a function of a ballistics parameter. In this embodiment, the ballistics parameter which changes is tape pack distribution as determined from the input of the takeup reel and supply reel diameters on lines 350,352 respectively. These variables are combined such as to produce a ratio of the reel diameters and a product of that value and a scaling constant determined by the family of velocity change profiles for the transport mechanism and the velocity change increment separting, adjacent profiles is used to access a tape distribution memory 358. The memory 358 stores velocity correction values as a function of tape distribution and outputs these values when addressed to a summing junction 362. The correction velocity values are added to the other inputs of the summing junction 362 which are the (DELTA/m)n velocity values on line 364 and the reference velocity values on line 366. These three values are added to become the commanded velocity value on line 368 which can be used as a speed reference for the takeup reel servo as described previously.

The correction values stored in the memory 358 can be negative or positive depending on the needed velocity correction for tape distribution. The most significant correction needed for distribution is when there is a disproportionate amount of tape is on the supply reel for the particular transport mechanism shown in FIG. 1. This occurs because the position reel servo for the supply reel can not generally move tape as quickly as the takeup reel velocity servo. Less correction is needed for a tape pack distribution as the tape becomes more evenly divided between the takeup reel and the supply reel. When the distribution becomes more pronounced toward the takeup reel, the correction values will be of opposite sign but less than those needed for a heavy supply reel. For tape transport in a different direction, the memory 358 receives an input on line 354 from the tape direction signal F/R. The values of correction stored in the memory for one direction will be functionally similar, needing more correction and of a different sign for the supply reel and the takeup reel, but will be of different values. Moreover, not only can the correction values be varied for tape direction but also for the distance to the cue point by an input on line 356. As was noted in the previous examples, the commanded velocity values are used as a speed reference for the takeup reel servo of FIG. 3.

Figures 20, 21:
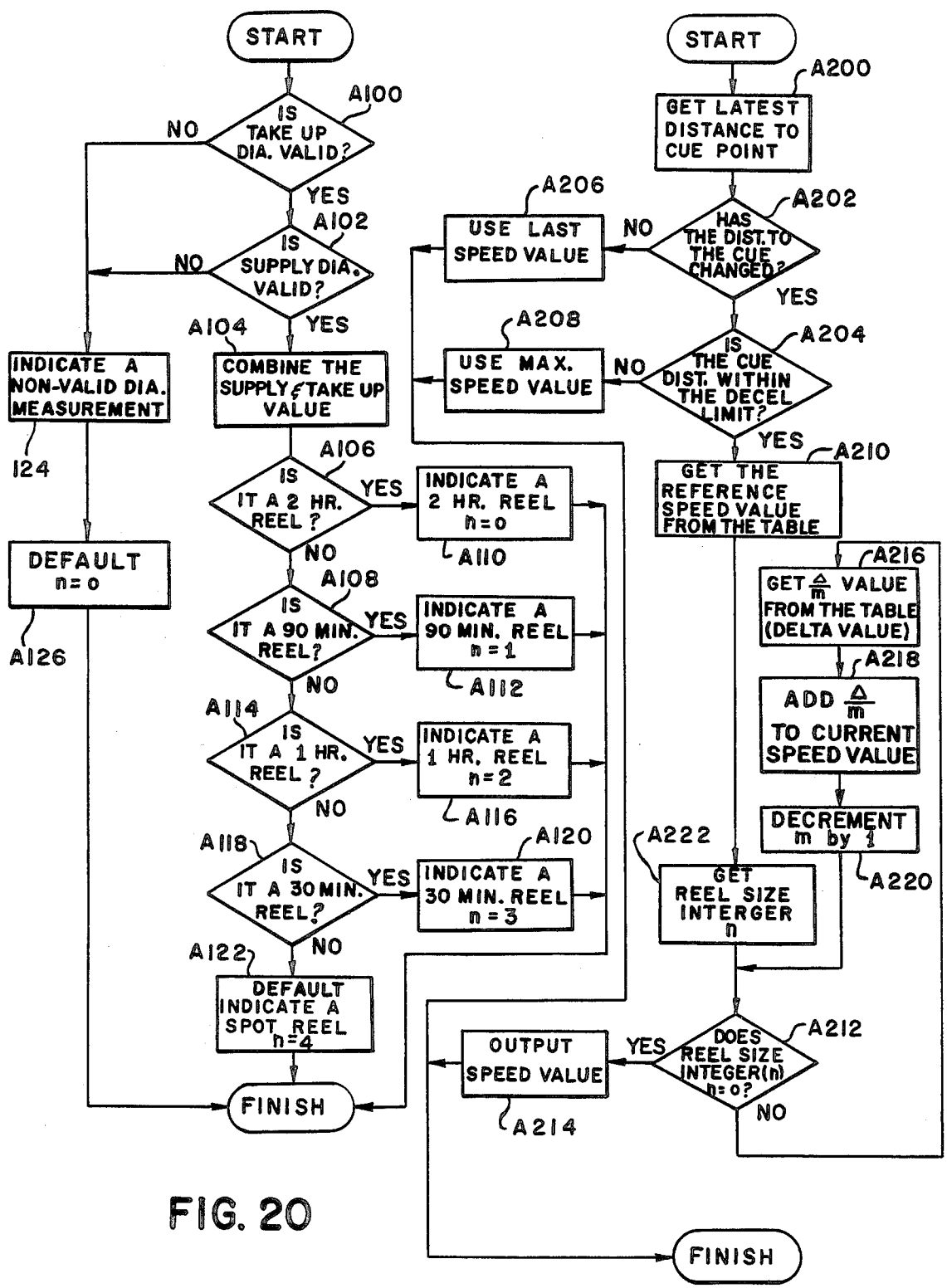
FIG. 20 is a detailed flowchart of the subroutine REELSIZE which is called by the routine CUE and which calculates an integer number n based on reel size.
FIG. 21 is a detailed flowchart of the subroutine CUE which is called during execution of the cue mode and which calculates a tape velocity command from an adaptive velocity change profile.

With respect now to FIG. 20, there is shown a detailed flowchart of a subroutine REELSIZE which is used to assign an integer number n to the actual reel size used on the tape transport. The REELSIZE routine uses the tape pack diameter values as determined by the circuitry of FIGS. 9A and B to determine the total tape pack or reel size on the transport. The result is an integer n between 0-4, with 0 representing a minimum deceleration profile for the largest reel anticipated to be used on the tape transport, which in the preferred embodiment is two-hour reel, and with 4 representing a maximum deceleration profile for the smallest, or spot reel.

The subroutine begins at block A100 where the takeup diameter value is obtained and tested to determine whether it is valid. If it is, the program continues to block A102 where the value for the supply reel diameter is tested for validity. If either of these values are invalid, then the program defaults to block A124, where an indication of a nonvalid diameter measurement is stored for error routines and other diagnostic and fault indicator subroutines. The program then continues to block A126 where a default value of n=0 is placed in the tape reel size integer storage location. The default value of n=0 will produce the slowest deceleration profile so that the transport may still operate in cue mode without overshoot for any reel size, at a reduced rate. The deceleration profile for the maximum size reel begins slowing the tape down early enough to stop the lighter tape reels without overshoot although somewhat inefficiently.

However, if both the takeup reel and supply diameters are valid, then they are combined in block A104 to determine a digital value for the total tape pack or reel size, and thus, the inertial loading on the transport. This total value is then tested in block A106 to determine whether it is a two-hour reel. If it is, then n is set equal to zero in block A110 before exiting. If the total value is a 90-minute reel, then an affirmative branch from block A108 transfers program control to block A112 where n is set equal to one before exiting the subroutine. Similarly, if the reel size is a one-hour reel, then block A114 will transfer control to block A116 where n is set equal to two before exiting. The last test in this chain is to determine whether the reel is of a 30-minute size in block A118. Passage of this test causes n to be set equal to three in block A120 before exiting. If the reel size has not been determined, then the spot reel size of n equals four is used as a default in block A122. It is noted that these tests actually determine if the reel size is greater than a comparison constant such that actual reel sizes between standard reels can be accounted for. The program then exits as the reel size has been determined and assigned an integer reel size value n of between 0–4.

FIG. 21 illustrates a detailed flowchart for the subroutine CUE which is used to output the reference commanded velocity value to the takeup reel servo over line 62 (FIG. 3). In block A200 the routine reads the latest distance separating the selected frame location from the cue point. This distance is obtained from the transport control 12 (FIG. 1) through the communication interface 132 (FIG. 3A) as described previously. The distance to the cue point is then compared in block A202 with the last distance obtained. If this distance has not changed, then the routine in block A206 outputs the last commanded velocity value which it generated. If, however, the distance to the cue point has changed, then in block A204 the distance to the cue point is compared with the predetermined distance which begins the deceleration profile range. If the transport is not within the deceleration profile range, then the answer to this test will be negative and program control transferred to block A208. Entry to block A208 will set the commanded velocity value equal to FF hexidecimal, which is the maximum velocity of the transport.

When the distance to the cue point is less than the predetermined limit, the transport should be decelerated according to an adaptive decleration profile. The program begins the process by obtaining the reference speed value from the first memory in block A210. This reference velocity obtained from memory 320 of FIG. 12 is the velocity value of the minimum deceleration profile which corresponds to the particular distance separating the selected frame location from the cue point that was transferred from the transport control 12. Next, in block A222, the reel size integer n is obtained by calling the subroutine REELSIZE previously described with reference to FIG. 11. The resulting integer n is then stored in an intermediate register of the microprocessor 100. Thereafter, block A212 is entered and the reel size integer n is tested to determine whether it is zero. If the reel size integer is equal to zero, then execution of the subroutine has determined that a maximum two hour tape reel size is on the transport mechanism thereby requiring use of the minimum deceleration velocity change profile. Therefore, an affirmative branch from block A212 to block A214 results in the output of the commanded velocity value as the reference speed value obtained by execution of block A210. In the foregoing description, this is the reference velocity value from the optimum deceleration profile for a two-hour reel size.

However, if the reel size integer n does not equal zero, then a faster profile is required because the tape reel size is less than the maximum. Thus, the program continues in block A216 by obtaining the minimum incremental velocity value, DELTA/m, from the second memory. This velocity value is added to the current reference value in block A218 and the integer value n decremented by one in block A220. Thereafter, the program transfers control back to block A212 where the test for n=0 is again accomplished. This program loop of blocks A217, A216-A220 is continued until the reel size integer n has been decremented to zero. Thus, for a tape reel size of 90-minutes, where n=1, one pass through the loop will be accomplished. For an integer number of 2, or one-hour reel size, two passes will be accomplished. Similarly, for a 30-minute reel, three passes, and for a spot reel, four passes will be accomplished. The program loop, thus, implements the iterative process described for the adder 344 in FIG. 13. Once the reel size integer has been decremented to zero, then the commanded velocity value is output by block A214. The method calculates the commanded velocity as the reference speed value plus n minimum incremental velocity values added to it.

While the memories 319 and 322 have been previously described as storing a single velocity value for every value of the distance when the selected frame location is the cue point, this is not really necessary because the deceleration profiles are substantially linear when the selected frame location is relatively far away from the cue point. Therefore, FIGS. 15 and 16 illustrate table formats for a cue reference profile and a DELTA/m profile implementing a compaction scheme where 4,096 values of distance are translated into 560 velocity values. It should be realized that the same functional data is being stored and that only fewer velocity change values for each profile are tabularized in memory to save space.

In FIG. 15 the cue reference table is shown in its compacted format where 560 velocity values are used to implement the minimum deceleration velocity change profile for the largest reel size that is used on the transport mechanism. For distances separating the selected frame location from the cue point in the range of zero to 255 frames, there are corresponding velocity values in the table. Likewise, for distances to the cue point in the range between 256-511 frames, there are matching velocity values. In the range of 512-1023 frames to the cue point, 16 velocity values are stored which equally divide this distance. Similarly, for the ranges of 1024-2047 and 2048-4095 frames to the cue point, 16 velocity values are stored which equally divide these distances. It is seen that the farther away the selected frame location is from the cue point, the larger the distance between changes in the velocity values. This breaks up the distance to the cue point in ranges which become more precise with respect to the determination of reference velocity values (increasingly more velocity values) as the selected frame location nears the cue point. It is also noted that this is formatting follows the physical curvature of the square law where the velocity profiles become more nonlinear nearer the cue point.

The DELTA/m table as seen in FIG. 16, which stores the velocity values corresponding to the difference between the maximum and minimum deceleration profiles divided by the number of increments, is formatted in a similar manner. The velocity values in the DELTA/m table correspond on a one-to-one basis with velocity values stored in the cue reference table for a particular distance to the cue point.

Another cue reference table is illustrated in FIG. 17 where 32 velocity values are stored corresponding to distances to the cue point between 0-31 frames. This cue reference table is termed the reverse tape transport direction reference table and is used as a substitute for the last 32 velocity values in the cue reference table of FIG. 15 when the transport is cueing in a reverse direction and between 0-31 frames from the cue point. These velocity values are substituted during this mode of operation because of the ballistics parameters of the transport mechanism change when in the reverse direction. If a bidirectional transport is used which has identical characteristics in the forward and reverse directions of tape transport, then this table would be unnecessary.

It should also be noted that for transports with forward and reverse tape transport characteristics which are very different from each other, then the table shown in FIG. 17 can be expanded to store a minimum deceleration profile with 560 values in a similar format to that shown in FIG. 15. Providing different velocity change profiles in dependence upon tape transport direction is necessary for a tape transport that lacks a tape tension control mechanism having a selectable reference position to compensate the different ballistics associated with the different tape transport directions. However, the above-described reel servo for the preferred embodiment of the invention does have an adjustable tension arm mechanism and only the last 32 frames to the cue point must be compensated in this manner.

To provide for the accessing of the reference velocity values and the DELTA/m velocity values of the compaction scheme described with reference to FIGS. 15 and 16 and for accessing different velocity values for different tape transport directions, the subroutine CUE illustrated in FIG. 12 must be modified to call a subroutine CUEDIST, which controls the calculation of the address of the particular reference velocity value and the particular DELTA/m velocity increment value from the tables illustrated in FIGS. 15, 16 and 17.

Figure 22:
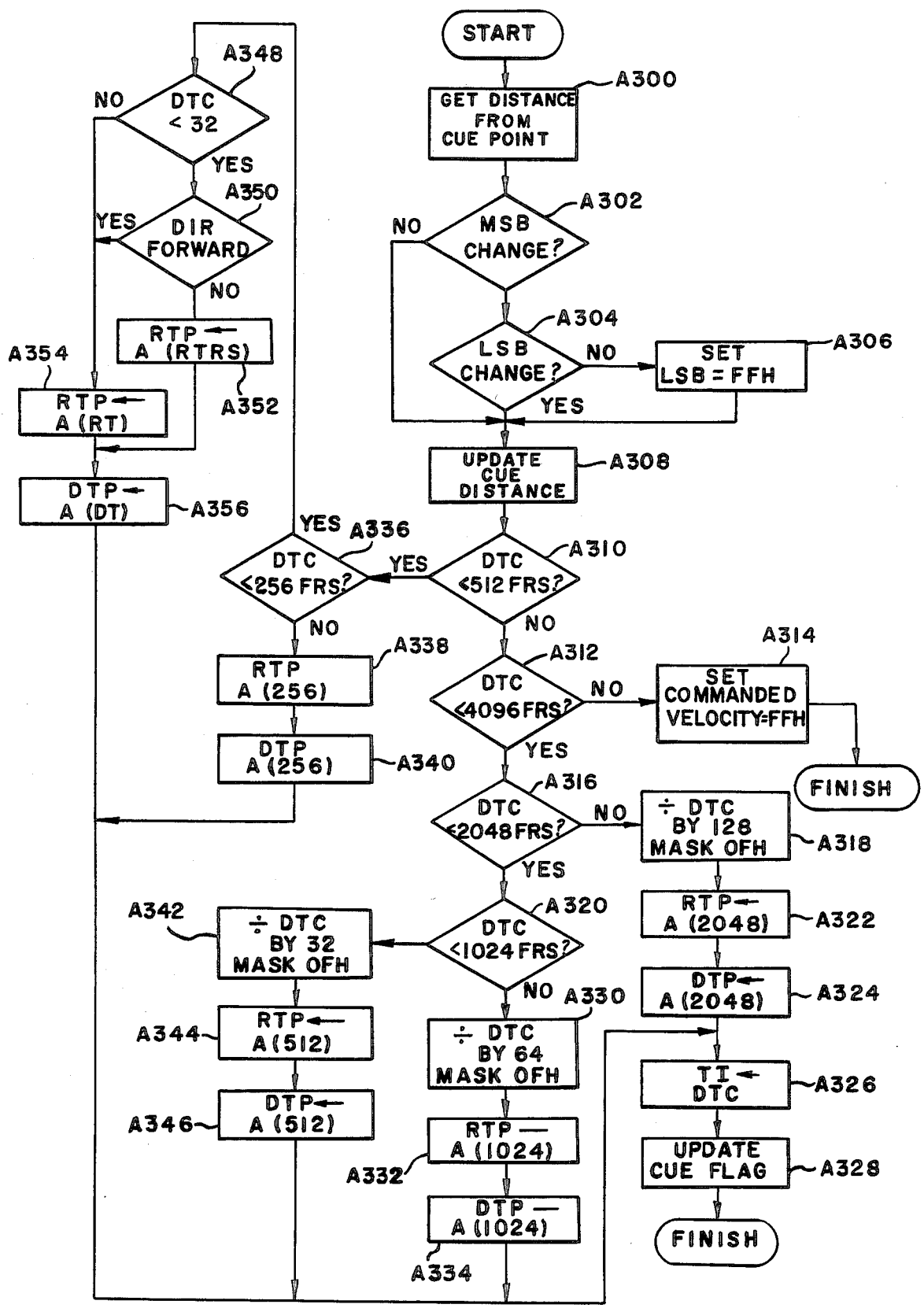
FIG. 22 is a detailed flowchart of the subroutine CUEDIST which is called by the subroutine CUE and which calculates the addresses of the velocity values stored in the first and second memories illustrated in FIG. 12 as a function of the distance to the cue point.

FIG. 22 illustrates a subroutine CUEDIST which controls the microprocessor 100 to perform this operation and whose call is inserted in FIG. 21 between blocks A204 and blocks A210. As will be more particularly described hereinafter, the step in block A210 of reading the stored reference value and in block A216 of reading the DELTA/m value are executed by the microprocessor 100 by adding an index number to a table pointer to calculate an address for the velocity value corresponding to the distance separating the selected frame location from the cue point. The index and pointer values are calculated by executing this routine. The tables of FIG. 15, 16 and 17 are then accessed with that particular address where the corresponding velocity value is stored in the table.

Returning to FIG. 22, the subroutine CUEDIST begins in block A300 where the distance to the cue point is read into an intermediate register. The distance to the cue point is tested in blocks A302, A304 to determine if the most significant byte and least significant byte have changed since the last execution of the routine. If the most significant byte has not changed, then the routine jumps directly to block A308 where the distance to the cue point is updated. If the most significant byte has changed, and the least significant byte has changed then block A308 again updates the distance to the cue. If the most significant byte has changed and the least significant byte has not changed, then before proceeding to block A308 the least significant byte is set equal to its maximum value FF hexidecimal in block A306.

After the updating of the distance to cue (DTC) is accomplished, the subroutine enters a number of tests to determine in which range of the cue table the distance is contained. In block A310, the distance is tested to determine whether it is less than 512 frames, and if not, then is tested to determine whether it is less than 4096 frames in block A312. If a negative response is elicited from both of these tests, then the DTC is greater than the predetermined point at which the deceleration profiles are to be entered. Therefore, the commanded velocity is set equal to a maximum value of FF hexidecimal in block A314 before the program returns.

However, if the answer to the test in block A312 is affirmative, then the DTC is between 512 frames and 4096 frames which is somewhere in the upper three ranges of the tables. Thus, control is transferred to block A316 where the DTC is tested to determine whether it is less than 2048 frames. If not, then the previous tests have determined that the actual distance to cue is in the upper range between 2048-4095 frames. This conclusion will produce a branch to the series of program steps beginning with block A318, whose execution divides the DTC by 128 and then masks off the lower four bits of the least significant byte. This accomplishes a segmentation of the actual DTC in 128 frame increments over the 2048-4095 frame range. This segmenting of the range associates one of the 16 velocity values of the range with the actual DTC.

Thereafter, the reference table pointer RTP is set equal to the beginning address of the 2048-4095 frame range in block A322. Similarly, the DELTA/m table pointer DTP is set equal to the beginning address of the 2048-4095 frame range of the DELTA/m table in block A324. The program continues in A326 by setting a table index TI equal to the DTC value which has been transformed into a value between 1-16. The cue flag is then updated in block A328 to indicate that an address for the cue tables has been calculated.

The cue reference table of velocity values is then accessed by adding the reference table pointer with the table index to determine an address at which the velocity value corresponding to the present distance to the cue point is stored. Similarly, the DELTA/m table is accessed by calculating an address which is the sum of the delta table pointer and the table index. The velocity increment value stored at that address then corresponds to the velocity value of the reference table at the particular distance to cue.

If the answer to the test in block A316 is affirmative, the program must continue to determine which range of the tables contains the actual distance to cue. An affirmative response to the test in block A316 indicates that the distance to cue is less than 2,048 frames but greater than 512 frames. Thus, the test in block A320 determines whether the distance to cue is less than 1024 frames to the cue point. If not, then the DTC is in the range of 1024-2048 frames. As illustrated in the previous case, the DTC is divided by a constant 64 for this range to associate the DTC with one of the 16 velocity values of the range. The last four bits of the least significant byte of the DTC is then selected by masking it with OFH in block A330.

The reference table pointer is set equal to the beginning of the range of velocity values corresponding to 1024-2047 frames in block A332. Next, the DELTA table pointer is set equal to the beginning address of the 1024-2047 frame range of that table in block A334. Thereafter, the table index is set equal to the DTC value which has been converted to a number between 1 and 16 to select the correct velocity in the range. The program then updates the cue flag in block A328, as previously indicated, before returning. The velocity value for the range selected is thereafter calculated as the table pointer value plus the table index for both the reference table and the DELTA/m table.

If the answer to the test in block A320 was affirmative, then the distance to cue is between 512-1023 frames. The affirmative answer will cause a transfer of control to block A342 where the DTC is divided by the constant 32. The result is then masked with the number OFH to select the last four bits of the least significant byte. This again associates the DTC value with one of the 16 velocity values of the range from 512-1023 frames to the cue point. Thereafter, in blocks A344 and A336, the reference table pointer and the DELTA table pointer are set equal to the beginning address of the range selected. Control is then transferred to block A326 where the table index is updated and block A328 where the cue flag is updated. For the 512-1023 frame range, the velocity value chosen is the data stored at the address calculated by adding the particular table pointer to the table index for either the reference table or the DELTA/m table.

For values of the DTC which are less than 512 frames an affirmative branch from block A310 will transfer control to block A336 where a test is performed to determine whether the distance to cue is less than 256 frames. If the answer to this test is negative, then in blocks A338 and A340, the reference table pointer and the DELTA/m table pointer are set equal to the beginning address of the range of 256-512 frames. Thereafter, the program transfers control to blocks A326 and A328 where the table index is set equal to the DTC and the cue flag is updated, respectively.

If the distance to cue is less than 256, then block A348 determines whether the DTC is less than 32. If not, then the reference table pointer is set equal to the beginning address of the reference table and the DELTA/m table pointer is set equal to the beginning address of the DELTA/m table in blocks A354, A356, respectively. However, if the distance to cue is less than 32 frames, then it must be determined which direction the transport is moving to be able to provide a directional correction if necessary. Thus, in block A350 the direction is tested by loading the direction signal bit F/R which was input from the transport control 12 (FIG. 1). If the direction is forward, then the program progresses through blocks A354, A356, A326 and A328 which forms the path the program normally takes in the range between 0-256 frames to the cue point. However, if the transport is within 32 frames of the distance to cue and the direction is not forward, i.e. the tape is being transported in the reverse direction, then the reference table pointer is set equal to the beginning address of the reference table for reverse tape transport direction shown in FIG. 17. This operation is performed by block A352 before control is transferred to block A356 which then continues in a normal manner for the range between 0-256 frames.

FIGS. 18 and 19 show the format of velocity correction values stored in the tape pack distribution memory 358 illustrated in FIG. 14. The distribution memory is generally comprised of two portions, each having 512 velocity correction values stored therein. FIG. 18 is for tape distributions when the transport mechanism is traveling in the forward direction and FIG. 19 is for tape distributions when the transport mechanism is traveling in the reverse direction. The table, either FIG. 18 or FIG. 19, is chosen based upon the logic level of the signal F/R and is addressed by values of the tape distribution ratio having digital values between 0-511.

Figure 23:
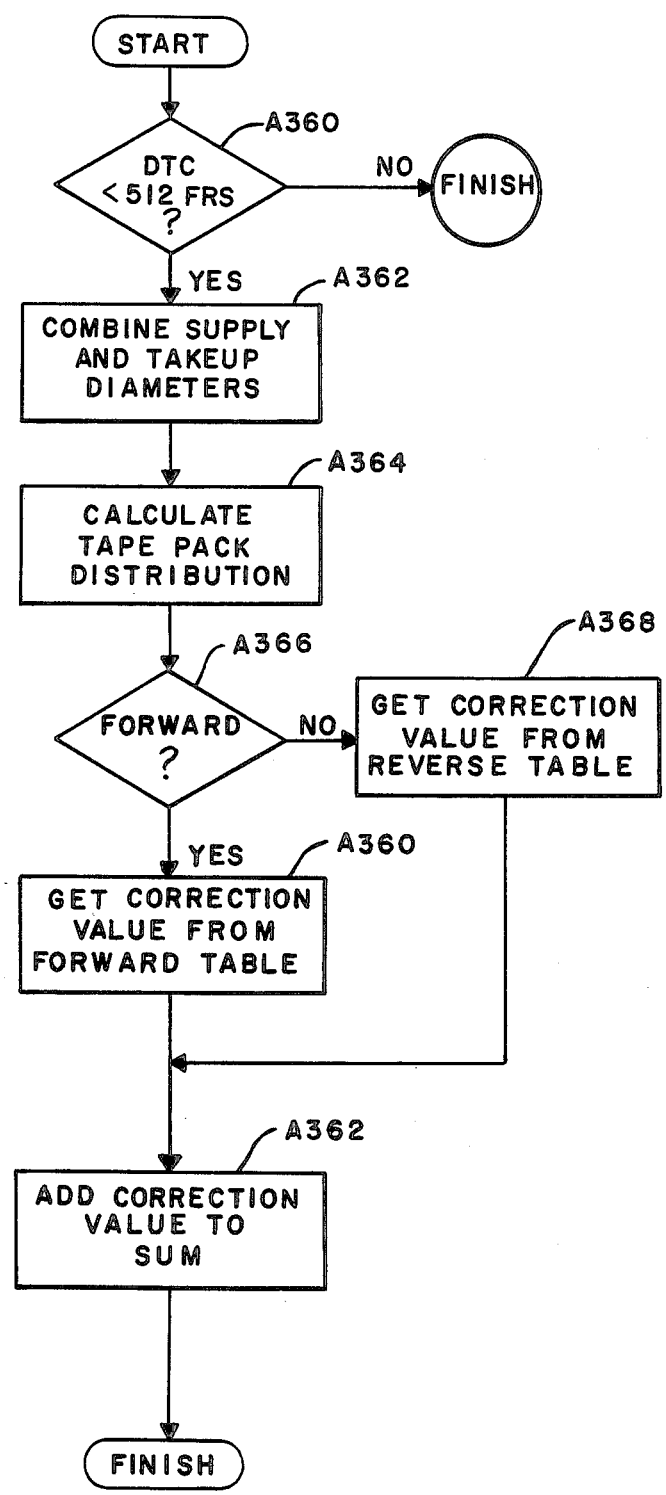
FIG. 23 is a detailed flowchart of the subroutine TAPEDIST which is called by the subroutine CUE and which calculates a correction factor for the commanded velocity values as a function of tape pack distribution.

FIG. 23 describes a detailed flow chart of the subroutine (TAPDIST) called by the program CUE which is used to generate velocity correction values from the tables in FIGS. 18 and 19 to add to the velocity values. The subroutine begins in block A340 where until the distance to the cue point is less than 512 frames a correction for tape distribution is not made. When the transport mechanism reaches 512 frames from the cue point, program control is transferred to block A342 and A344 where a value of tape pack distribution between 0-512 is calculated from the ratio of the supply reel and takeup reel tape pack diameters. Next in block A356 the program determines from the signal F/R input from the circuitry of FIG. 9A whether the tape transport direction is forward or reverse. If forward, block A350 is executed to address the table in FIG. 18 with the value calculated for the tape distribution ratio as weighted by the scaling constant described hereinbefore with reference to FIG. 14. If reverse, block A348 is executed to address the table in FIG. 19 with the value calculated for the tape distribution ratio. The correction value accessed, whether from the forward on reverse table, is then added to the commanded velocity value. The result is used as the speed reference for the takeup reel servo as described previously.

While the preferred embodiments of the invention have been illustrated, it will be obvious to those skilled in the art that various modifications and changes may be made thereto, without departing from the spirit and the scope of the invention, as is defined in the appended claims.

What is claimed is:

1. A method of controlling the transport of a tape relative to a reference point along a path of said tape, said tape being transported by a tape transport mechanism in accordance with a velocity change profile which changes with a changing distance separating said reference point from a selected location on said tape, said velocity change profile being determined by a selected parameter of the tape transport mechanism, comprising the steps of:

> providing and storing sets of velocity change profile values, each set pertaining to one velocity profile determined by a different value of said selected parameter;
>
> monitoring an actual value of said selected parameter when the tape is being transported on said transport mechanism; and
>
> selecting one set of said velocity change profile values corresponding to said monitored value of said selected parameter to control the speed of said transport mechanism for transporting the selected location on said tape to said reference point.

2. The method of claim 1 wherein the step of monitoring an actual value of said selected parameter comprises monitoring an inertial load provided by said tape on said transport mechanism.

3. The method of claim 2 wherein the step of monitoring sid inertial load comprises monitoring a total amount of tape transported by said transport mechanism.

4. The method of claim 3 wherein said tape is transported between a pair of reels of tape and wherein the step of monitoring said inerted load comprises monitoring the amount of tape on each reel to obtain said total amount of tape transported by said transport mechanism.

5. The method of claim 1 wherein said step of providing and storing said sets of velocity change profile values comprises:

> storing a first set of velocity change profie values corresponding to a first value of said selected parameter;
>
> storing a second set of velocity change profile values corresponding to a second value of said selected parameter; and
>
> calculating a third set of velocity profile values as a sum of one of said stored set of velocity profile values and a differential value which is proportional to a difference between said first and second set of velocity profile values, said proportion corresponding to a proportion of a difference between said first and monitored values of said selected parameter and a difference between said first and second parameter values.

6. The method of claim 1 wherein the step of monitoring said selected parameter comprises monitoring distribution of tape between a pair of reels of tape.

7. The method of claim 1 wherein the step of monitoring an actual value of said selected parameter comprises monitoring a parameter whose variances change a frictional drag of the transport mechanism.

8. The method of claim 7 wherein the tape is transported between a pair of reels of tape, and wherein the frictional drag varies with direction of tape transport between said pair of reels and the step of monitoring comprises monitoring said direction.

9. The method of claim 1 wherein said tape is transported between a pair of reels of tape, the step of monitoring said selectd parameter comprising monitoring at least one of a total amount of tape transported by said transport mechanism, distribution of said tape between said reels of tape, and a direction of tape transport between said reels, and wherein said set of velocity change profile values is selected as corresonding to at least one said monitored parameter.

10. The method of claim 1, wherein said tape is a video tape having video information recorded thereon in the form of consecutive frames, wherein said selected location on said tape is a cue point indicating a selected frame location, and wherein said set of velocity change profile values is selected to correspond to said monitored parameter value to control the speed of said transport mechanism for transporting and parking the selected cue point at said reference point.

11. A method of controlling a tape transport mechanism for moving a tape relative to a reference point along a path of said tape to a cue point location on the tape during a cue mode of operation, using a signal recorded at regular intervals along the length of said tape, said tape being moved in accordance with a velocity change profile which changes with a changing distance separating said reference point from said cue point location, said velocity change profile being determined by a selected parameter of the tape transport mechanism, comprising the steps of:

> selecting a cue point location on the tape;
>
> determining a distance along the tape separating the cue point location from the reference point;
>
> providing and storing sets of velocity change profile values, each set pertaining to one velocity profile determined by a different value of said selected parameter, said velocity change profile values of each set changing with a distance separating said cue point location from said reference point;
>
> monitoring an actual value of said selected parameter when said tape is being transported by said transport mechanism; and
>
> moving the tape along said path at a velocity determined by a changing distance separating said selected location from said reference point and by a set of velocity change profile values determined by said monitored value of said selected parameter and stopping said tape when said cue point location reaches said reference point.

12. A method of controlling the velocity of transport of a video tape having video information recorded thereon in the form of consecutive frames, comprising the steps of:

> selecting a desired frame location recorded on the tape, representing a cue point which is to be moved during a cue mode of operation to a reference location along a path of said tape and stopped;
>
> determining a distance along said path separating said cue point from said reference location;
>
> providing a command indicative of desired speed of said transport mechanism to effect a change in said desired speed when said distance reaches a predetermined value;
>
> providing and storing sets of velocity change profile values, each set pertaining to one velocity profile determined by a different value of a selected parameter of the tape transport mechanism, said velocity change profile values of each set changing with said distance;
>
> monitoring an actual value of said selected parameter when said tape is being transported by said transport mechansim; and wherein
>
> said command is provided in accordance with a set of velocity change profile values determined by said monitored value of said selected parameter.

13. A control apparatus for controlling a transport mechanism for transporting a tape relative to a reference point along a path of said tape, in accordance with a velocity change profile which changes with a changing distance separating said reference point from a selected location on said tape, said velocity change profile being determined by a selected parameter of the tape transport mechanism, comprising;

means for providing and storing sets of velocity change profile values, each set pertaining to one velocity profile determined by a different value of said selected parameter;

means for monitoring an actual value of said selected parameter during the transport of said tape by said transport mechanism; and means for controlling the speed of said transport mechanism in accordance with a set of velocity change profile values corresponding to said monitored value of said selected parameter, for transporting the selected location on said tape to said reference point.

14. The apparatus of claim 13 wherein said means for monitoring is coupled to monitor an inertial load provided by said tape on the transport mechanism;

said apparatus further comprises means for determining a distance along said path separating the selected location on the medium from the reference point;

wherein said means for providing and storing comprises:

means for generating a first set of speed reference signal values for determined distances corresponding to a maximum inertial load on the transport mechanism;

means for generating a second set of speed reference signal values for said determined distances corresonding to another inertial load on the transport mechanism less than the maximum inertial load; and wherein said means for controlling comprises:

means for generating third speed reference signal values in response to the generated first and second speed reference signal values in accordance with the actual monitored inertial load on the tape transport mechanism.

15. The apparatus of claim 14 wherein said third speed reference signal generating means is coupled to generate a speed reference signal corresponding to the sum of the first speed reference signal plus the product of the difference between the first and second speed reference signal values for the same determined distance, times the ratio of the difference between the maximum and actual inertial loads to the difference between the maximum and said another inertial load.

16. The apparatus of claim 13 wherein said means for monitoring is coupled to monitor an inertial load provided by said tape on the transport mechanism;

said apparatus further comprises means for determining a distance along said path separating said selected location on the medium from the reference point; and wherein said means for providing and storing comprises:

means for generating a first set of speed reference signal values for determined distances corresponding to a selected reference inertial load on the transport mechanism;

means for generating a set of incremental speed reference signal values for said determined distances corresponding to a known increment in said inertial load with respect to said selected reference inertial load; and wherein said means for controlling comprises:

means for summing said first set of speed reference signal values with a proportion of said set of incremental speed reference signal values to obtain a desired set of velocity profile values corresponding to said monitored inertial load, said proportion corresponding to a ratio of a difference between said reference inertial load and said monitored inertial load to said known increment in said inertial load.

17. The apparatus of claim 16 wherein:

said means for generating a first set of speed reference signal values is coupled to generate minimum speed reference signal values corresponding to a maximum inertial load;

said proportion is equal to n/m, where n and m are integers;

said means for generating a set of incremental speed reference signal values is coupled to generate a set of difference speed reference signal values divided by m, said set of difference values corresponding to a difference between said minimum speed reference signal values and known maximum speed reference signal values corresponding to a minimum inertial load; and said means for summing is coupled to sum said minimum speed reference signal values with a number of n of said difference speed reference signal values divided by m.

18. The apparatus of claim 16 wherein said first set of speed reference signal values is stored in a first memory means at addresses representative of the distances separating the selected location from the reference point; and said means for generating said first set of speed reference signal values is coupled to address said first memory means in response to the determined distance.

19. The apparatus of claim 16 wherein said incremental speed reference signal values are stored in a second memory means at addresses representative of the distances separating the selected location from the reference point; and said means for generating said incremental speed reference signal values is coupled to address said second memory means in response to the determined distance.

20. The apparatus of claim 13, wherein said means for providing and storing comprises:

means for generating a set of minimum speed reference signal values corresonding to a maximum inertial load;

means for generating a set of incremental speed reference signal values as a difference between said minimum speed reference signal values and known maximum speed reference signal values corresponding to a minimum inertial load, divided by an integer m; and wherein said means for controlling comprises:

means for summing said minimum speed reference signal values with an integral number n of said incremental speed reference signal values, where n/m is representative of a ratio of a difference between said maximum and said monitored actual inertial load to a difference between the maximum and minimum inertial loads.

21. The apparatus of claim 13 wherein said means for monitoring is coupled to monitor an inertial load provided by said tape on said transport mechanism.

22. The apparatus of claim 21 wherein said means for monitoring is coupled to monitor a total amount of tape transported by said transport mechanism.

23. The apparatus of claim 22 wherein said tape is transported between a pair of reels of tape and wherein said means for monitoring is coupled to monitor the amount of tape on each reel.

24. The apparatus of claim 13 wherein said tape is transported between a pair of reels of tape and said means for monitoring is coupled to monitor distribution of tape between said reels of tape.

25. The apparatus of claim 13 wherein said means for monitoring is coupled to monitor a parameter whose variances change a frictional drag of the transport mechanism.

26. The apparatus of claim 13 wherein said tape is transported between a pair of reels of tape and wherein a frictional drag of the tape transport mechanism changes with direction of tape transport between said pair of reels and said means for monitoring is coupled to monitor said direction.

27. An apparatus for controlling a transport mechanism for transporting a tape having video information recorded thereon, relative to a reference point along a path of said tape, in accordance with a velocity change profile which changes with a changing distance separating said reference point from a selected cue point location on the tape, said velocity change profile being determined by an inertial load provided by a total amount of tape on said transport mechanism, comprising:

means for determining a distance along said path separating said selected cue point location from said reference point;

means for generating for said detected distances a set of minimum speed reference signal values corresponding to a maximum inertial load, provided by a largest total amount of tape, and storing said minimum values in a first memory means;

means for generating for said detected distances a set of incremental speed reference signal values corresonding to a known increment in said inertial load, provided by a known increment in said total amount of tape, and storing said incremental values in a second memory means;

means for monitoring an actual total amount of tape on said transport mechanism correponding to an actual inertial load; and means for combining said stored minimum speed reference signal values with a proportion of said stored incremental speed reference signal values, where said proportion corresponds to ratio of a difference between said maximum inertial load and said actual inertial load to said known increment in said inertial load, to obtain a set of velocity profile values corresponding to said actual inertial load.

* * * * *

UNITED STATES PATENT AND TRADEMARK OFFICE
CERTIFICATE OF CORRECTION

PATENT NO. : 4,731,679
DATED : March 15, 1988
INVENTOR(S) : David C. O'Gwynn and Thomas L. Helmers It is certified that error appears in the above-identified patent and that said Letters Patent is hereby corrected as shown below:

Column 25, line 10, "V=p2ax" should read --$V=\sqrt{2ax}$--;

Column 25, line 14, "V=2ax" should read --$V=\sqrt{2ax}$--;

Column 37, line 24, "sid" should read --said--;

Column 37, line 29, "inerted load" should read --selected parameter--;

Column 37, line 65, "selectd" should read --selected--;

Column 38, line 53, after "of" (first occurrence) insert --a--;

Column 39, line 36 to 37, "corresonding" should read --corresponding--;

Column 40, line 55, "corresonding" should read --corresponding--;

Column 42, line 15 to 16, "corresonding" should read --corresponding--;

Column 42, line 21, "corresonding" should read --corresponding--.

Signed and Sealed this

Eighteenth Day of April, 1989

*Attest:*

DONALD J. QUIGG

*Attesting Officer*      *Commissioner of Patents and Trademarks*